US011973275B2

(12) United States Patent
Chiang et al.

(10) Patent No.: US 11,973,275 B2
(45) Date of Patent: Apr. 30, 2024

(54) ANTENNA FOR MULTI-BROADBAND AND MULTI-POLARIZATION COMMUNICATION

(71) Applicant: MEDIATEK Inc., Hsin-Chu (TW)

(72) Inventors: Chung-Hsin Chiang, Hsinchu (TW); Li-Yu Chen, Hsinchu (TW); Shih-Huang Yeh, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 37 days.

(21) Appl. No.: 17/838,425

(22) Filed: Jun. 13, 2022

(65) Prior Publication Data

US 2022/0384966 A1 Dec. 1, 2022

Related U.S. Application Data

(62) Division of application No. 16/898,587, filed on Jun. 11, 2020, now Pat. No. 11,387,557.

(Continued)

(51) Int. Cl.

| | |
|---|---|
| ***H01Q 5/30*** | (2015.01) |
| ***H01Q 1/48*** | (2006.01) |
| ***H01Q 5/307*** | (2015.01) |
| ***H01Q 5/385*** | (2015.01) |
| ***H01Q 5/392*** | (2015.01) |
| ***H01Q 5/50*** | (2015.01) |
| ***H01Q 9/16*** | (2006.01) |

(Continued)

(52) U.S. Cl.

CPC ............... *H01Q 5/392* (2015.01); *H01Q 1/48* (2013.01); *H01Q 5/307* (2015.01); *H01Q 5/385* (2015.01); *H01Q 5/50* (2015.01); *H01Q 9/16* (2013.01); *H01Q 21/062* (2013.01); *H01Q 21/24* (2013.01)

(58) Field of Classification Search

CPC ...... H01Q 1/48; H01Q 5/30–50; H01Q 9/285; H01Q 21/06–26

See application file for complete search history.

(56) References Cited

U.S. PATENT DOCUMENTS

| | | | |
|---|---|---|---|
| 9,000,996 | B2 | 4/2015 | Holland et al. |
| 10,148,015 | B2 | 12/2018 | Heyde et al. |

(Continued)

FOREIGN PATENT DOCUMENTS

| | | | |
|---|---|---|---|
| CN | 104471792 | A | 3/2015 |
| CN | 207517886 | U | 6/2018 |

OTHER PUBLICATIONS

CN Office Action dated Aug. 31, 2022 in Chinese application No. 202010644177.0.

(Continued)

*Primary Examiner* — Hasan Islam

(74) *Attorney, Agent, or Firm* — McClure, Qualey & Rodack, LLP

(57) ABSTRACT

An antenna for multi-broadband and multi-polarization communication, may include a plurality of radiators configured to jointly function as one or more dipoles, a first feed terminal for a first signal of a first polarization, and a second feed terminal for a second signal of a second polarization different from the first polarization. Each radiator may be configured to contribute to resonances at two or more nonoverlapping bands. In an embodiment, the antenna may further include a third feed terminal for a third signal of the first polarization, and a fourth feed terminal for a fourth signal of the second polarization.

16 Claims, 21 Drawing Sheets

Related U.S. Application Data

(60) Provisional application No. 62/872,266, filed on Jul. 10, 2019.

(51) Int. Cl.
*H01Q 21/06* (2006.01)
*H01Q 21/24* (2006.01)

(56) References Cited

U.S. PATENT DOCUMENTS

| | | | | |
|---|---|---|---|---|
| 10,224,646 | B2 | 3/2019 | Tang et al. | |
| 2010/0007572 | A1 * | 1/2010 | Jones | H01Q 9/28 343/798 |
| 2011/0057852 | A1 | 3/2011 | Holland et al. | |
| 2018/0191075 | A1 | 7/2018 | Semonov | |
| 2018/0331419 | A1 | 11/2018 | Varnoosfaderani et al. | |
| 2020/0388933 | A1 | 12/2020 | Chen et al. | |
| 2021/0175639 | A1 | 6/2021 | Wang et al. | |

OTHER PUBLICATIONS

TW Office Action dated Nov. 25, 2021 in Taiwan application No. 109122786.

* cited by examiner

ANTENNA FOR MULTI-BROADBAND AND MULTI-POLARIZATION COMMUNICATION

This application is a divisional application of U.S. patent application Ser. No. 16/898,587, filed Jun. 11, 2020, now U.S. Pat. No. 11,387,557, which claims the benefit of U.S. provisional application Ser. No. 62/872,266, filed Jul. 10, 2019; the subject matter of each of the applications is incorporated herein by reference.

FIELD OF THE INVENTION

The present invention relates to an antenna for multi-broadband and multi-polarization communication, more particularly, to a dipole antenna achieving dual-broadband by innovatively configured radiators and parasitic elements, wherein each radiator may include a folded arm and a ground wall with a meandering portion, and each parasitic element may partially surround an associated one of the radiators.

BACKGROUND OF THE INVENTION

Antenna is essential for modern electronic device which requires radio-frequency functionality, such as smart phone, tablet computer and notebook computer, etc. As communication standards evolve to provide faster data transfer rate and higher throughput, antenna needs to satisfy more challenging demands. For example, to meet requirements of fifth-generation (5G) mobile telecommunication at FR2 bands with MIMO (multi-input multi-output) of dual-polarization diversity, an antenna needs to support bandwidths broader than 19.5% and 16.1% respectively at two nonoverlapping bands starting from 24.25 to 29.5 GHz and from 37.0 to 43.5 GHz, and also needs to transmit and/or receive independent signals of different polarizations (e.g., two signals carrying two different data streams respectively by a horizontal polarization and a vertical polarization) with a high signal isolation between these different polarizations, so as to provide a high cross-polarization discrimination (XPD).

Besides, antenna desires to be compact in size since modern electronic device desires to be slim in form factor and therefore only has limited space left for antenna. Accordingly, antenna needs to have a high bandwidth-to-volume ratio representing bandwidth per unit volume (measured in, e.g., Hz/(mm^3)).

In conventional art, a stacked patch antenna is utilized to support two bands by stacking two patches, but fails to satisfy bandwidth requirements of 5G mobile telecommunication. The stacked patch antenna also suffers a relatively low bandwidth-to-volume ratio.

SUMMARY OF THE INVENTION

An objectivity of the invention is providing an antenna (e.g., 100 in FIGS. 1*a* to 1*f*) for multi-broadband (e.g., dual-broadband) and multi-polarization (e.g., dual-polarization) communication. The antenna may include a plurality of mutually separated radiators (e.g., r[1] to r[4] in FIGS. 1*a* to 1*f* and 2*a* to 2*c*) connected to a ground plane (e.g., G0 in FIG. 1*a*). The plurality of radiators may be configured to jointly function as one or more (e.g., two) dipoles, and each said radiator may be configured to contribute to resonances at two or more nonoverlapping bands (e.g., 810 and 820 in FIG. 8).

Each said radiator (e.g., r[n] for n=1 to 4) may include a conductive arm (e.g., a[n] in FIGS. 2*b* and 2*c*) and a conductive ground wall (e.g., g[n] in FIGS. 2*b* and 2*c*) connecting the arm to the ground plane. Each arm may include a conductive arm plate (e.g., b[n] in FIGS. 2*b* and 2*c*) and a conductive folded arm (e.g., h[n1] or h[n2] in FIG. 2*c*). The ground wall may extend outward (e.g., downward along negative z-direction, FIGS. 2*b* and 2*c*) from a bottom surface (e.g., bb[n] in FIG. 2*c*) of the arm plate to the ground plane. The folded arm may extend outward (e.g., downward, FIGS. 2*b* and 2*c*) from the bottom surface of the arm plate or from a top surface of the arm plate opposite to the bottom surface of the arm plate, and the folded arm may be separated from the ground wall and the ground plane (e.g., FIG. 2*d*).

In an embodiment (e.g., FIG. 2*d*), the ground wall may extend outward from a first site (e.g., gs[n1] or gs[n2]) of the bottom surface of the arm plate, and the folded arm may extend outward from a second site (e.g., hs[n1] or hs[n2]) of the top or bottom surface of the arm plate; on a geometric reference surface (e.g., xy-plane) parallel to the bottom surface of the arm plate, a projection of the first site may be disposed in an inner geometric region (e.g., bc[n] in FIG. 2*d*) inside a projection of the arm plate, and a projection of the second site may be disposed in a peripheral geometric region (e.g., bd[n], FIG. 2*d*) between a boundary of the inner geometric region and a boundary of the projection of the arm plate, wherein the boundary of the inner geometric region and the boundary of the projection of the arm plate may be arranged not to intersect.

In an embodiment (e.g., FIG. 2*f* or 2*g*), each folded arm may include an extension plate (e.g., hd[n1] or hd[n2]) and a first extension wall (e.g., hc[n1] or hc[n2]). The extension plate may be parallel to the arm plate, and may be separated from the arm plate. The first extension wall may connect the arm plate and the extension plate. In an embodiment (e.g., FIG. 2*g*), each folded arm may further include a second extension wall (e.g., hf[n1] or hf[n2]) which may extend outward from a top or bottom surface of the extension plate, and may be separated from the arm plate and the first extension wall.

In an embodiment, the antenna may further include a plurality of conductive parasitic elements (e.g., p[1] to p[4] in FIGS. 1*a* to 1*f* and 4*a*). The plurality of parasitic elements may be mutually insulated, and each said parasitic element may be insulated from the plurality of radiators and the ground plane. On a geometric reference surface (e.g., xy-plane in FIG. 4*a*), a projection of each said parasitic element (e.g., p[n] for n=1 to 4) may extend between two gaps (e.g., gp[1] and gp[2] in FIG. 4*a*) which clamp a projection of an associated one (e.g., r[n]) of the plurality of radiators, and may be arranged not to entirely enclose a geometric origin (e.g., p0 in FIG. 4*a*) which may be a geometric center of the projections of the plurality of radiators.

In an embodiment (e.g., FIG. 4*d*), on the geometric reference surface, the projection of each said parasitic element (e.g., p[n]) may partially overlap the projection of said associated one (e.g., r[n]) of the plurality of radiators. In an embodiment (e.g., FIG. 4*e*), on the geometric reference surface, the projection of each said parasitic element may be inside the projection of said associated one of the plurality of radiators. In an embodiment (e.g., FIG. 4*f*), on the geometric reference surface, the projection of each said parasitic element may be configured not to overlap the projection of said associated one of the plurality of radiators.

In an embodiment (e.g., FIGS. 1*a* to 1*f* and 5*a*), the antenna may further include one or more conductive coupling elements (e.g., c[1] to c[4]). Each said coupling element may be insulated from the plurality of radiators, the plurality of parasitic elements and the ground plane. On the geometric reference surface, a projection of each said coupling element (e.g., c[1] or c[4] in FIG. 5*a*) may have two portions (e.g., 511 and 512 or 514 and 515 in FIG. 5*a*) respectively inside the projections of two (e.g., p[1] and p[2] or p[4] and p[1]) of the plurality of parasitic elements.

In an embodiment (e.g., FIG. 4*a* or 4*e*), on the geometric reference surface, the projections of any two of the plurality of parasitic elements may be arranged not to overlap.

In an embodiment (e.g., FIG. 4*g* or 5*b*), on the geometric reference surface, the projections of two (e.g., p[1] and p[2]) of the plurality of parasitic elements may partially overlap.

In an embodiment (e.g., FIG. 4*c*), each said parasitic element may include at least two serially connected sections (e.g., s[n1] to s[nQ] in FIG. 4*c*), and every two adjacent ones (e.g., s[n1] and s[n2]) of said sections may extend along two nonparallel directions (e.g., v[n1] and v[n2]).

In an embodiment, the ground wall of each radiator may include a meandering portion (e.g., gb[n] in FIGS. 2*d*, 3*a* and 3*c* to 3*e*, or gb[n1], gb[n2] in FIG. 3*b*) which may cause a distance (e.g., d1 in FIG. 2*d*) between the arm and the ground plane to be shorter than a length of a current conduction path (e.g., 200) along the ground wall between the arm and the ground plane.

In an embodiment (e.g., one of FIGS. 3*a* to 3*e*), the ground wall may further include a first support wall (e.g., ga[n1] or ga[n2]) and a second support wall (e.g., gc[n1] or gc[n2]); the first support wall may connect the arm and the meandering portion, and the second support wall may connect the meandering portion and the ground plane.

In an embodiment (e.g., FIG. 3*a*), the meandering portion (e.g., gb[n]) may include: a first step plate (e.g., gp_a[n]) connected to the first support wall, a second step plate (e.g., gp_b[n]) connected to the second support wall, and a connection wall (e.g., gw[n]) connecting the first step plate and the second step plate. On a geometric reference surface (e.g., xy-plane) parallel to the ground plane, a projection (e.g., xyb[n]) of the connection wall may be arranged not to overlap projections (e.g., xya[n1], xya[n2], xyc[n1] and xyc[n2]) of the first support wall and the second support wall.

In an embodiment (e.g., FIG. 3*a*), on the geometric reference surface, the projections (e.g., xya[n1], xya[n2], xyc[n1] and xyc[n2]) of the first support wall and the second support wall may be arranged not to overlap.

In an embodiment (e.g., FIGS. 6*a*, 7*a* and 7*d*), the antenna may also include two feed terminals (e.g., Pt1 and Pt2) for two multi-band signals (e.g., M1 and M2 in FIG. 6*a*) of two different polarizations.

In an embodiment (e.g., FIGS. 6*b*, 7*b* and 7*c*), the antenna may also include four feed terminals (e.g., Pt1*a*, Pt2*a*, Pt1*b* and Pt2*b*) for two low-band signals (e.g., LB1 and LB2 in FIG. 6*b*) of two different polarizations and two high-band signals (e.g., HB1 and HB2 in FIG. 6*b*) of the two different polarizations. In an embodiment (e.g., FIGS. 6*c* and 7*b*), the four feed terminals may be arranged fora first pair of multi-band differential signals (e.g., M1+ and M1− in FIG. 6*c*) of a first polarizations and a second pair of multi-band differential signals (e.g., M2+ and M2− in FIG. 6*c*) of a second polarization different from the first polarization.

An objective of the invention is providing an antenna for multi-broadband and multi-polarization communication. The antenna may include a plurality of mutually separated radiators and four feed terminals (e.g., Pt1*a*, Pt1*b*, Pt2*a* and Pt2*b* in FIG. 6*b* or 6*c*). The plurality of radiators may be conductively connected to a ground plane, and may jointly function as one or more dipoles. Two (e.g., Pt1*a* and Pt1*b* in FIG. 6*b* or 6*c*) of said four feed terminals may be arranged for a first low-band signal (e.g., LB1 in FIG. 6*b*) and a first high-band signal (e.g., HB1 in FIG. 6*b*) of a first polarization, or for a first pair of multi-band differential signals (e.g., M1+ and M1− in FIG. 6*c*) of the first polarization. The other two (e.g., Pt2*a* and Pt2*b* in FIG. 6*b* or 6*c*) of said four feed terminals may be arranged for a second low-band signal (e.g., LB2 in FIG. 6*b*) and a second high-band signal (e.g., HB2 in FIG. 6*b*) of a second polarization, or for a second pair of multi-band differential signals (e.g., M2+ and M2− in FIG. 6*c*) of the second polarization.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
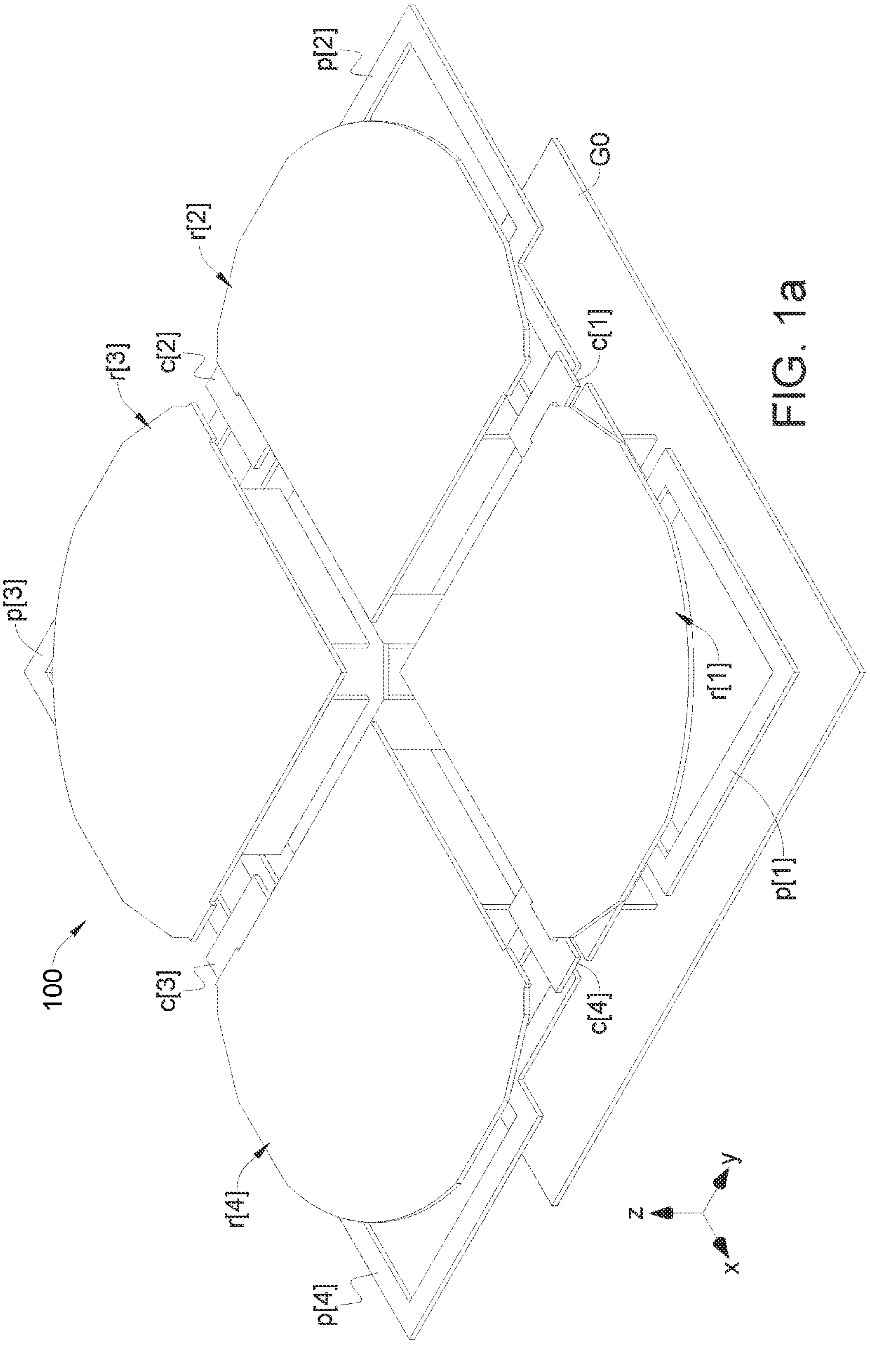
FIG. 1*a* depicts a three-dimensional (3D) view of an antenna according to an embodiment of the invention.
Figure 1B:
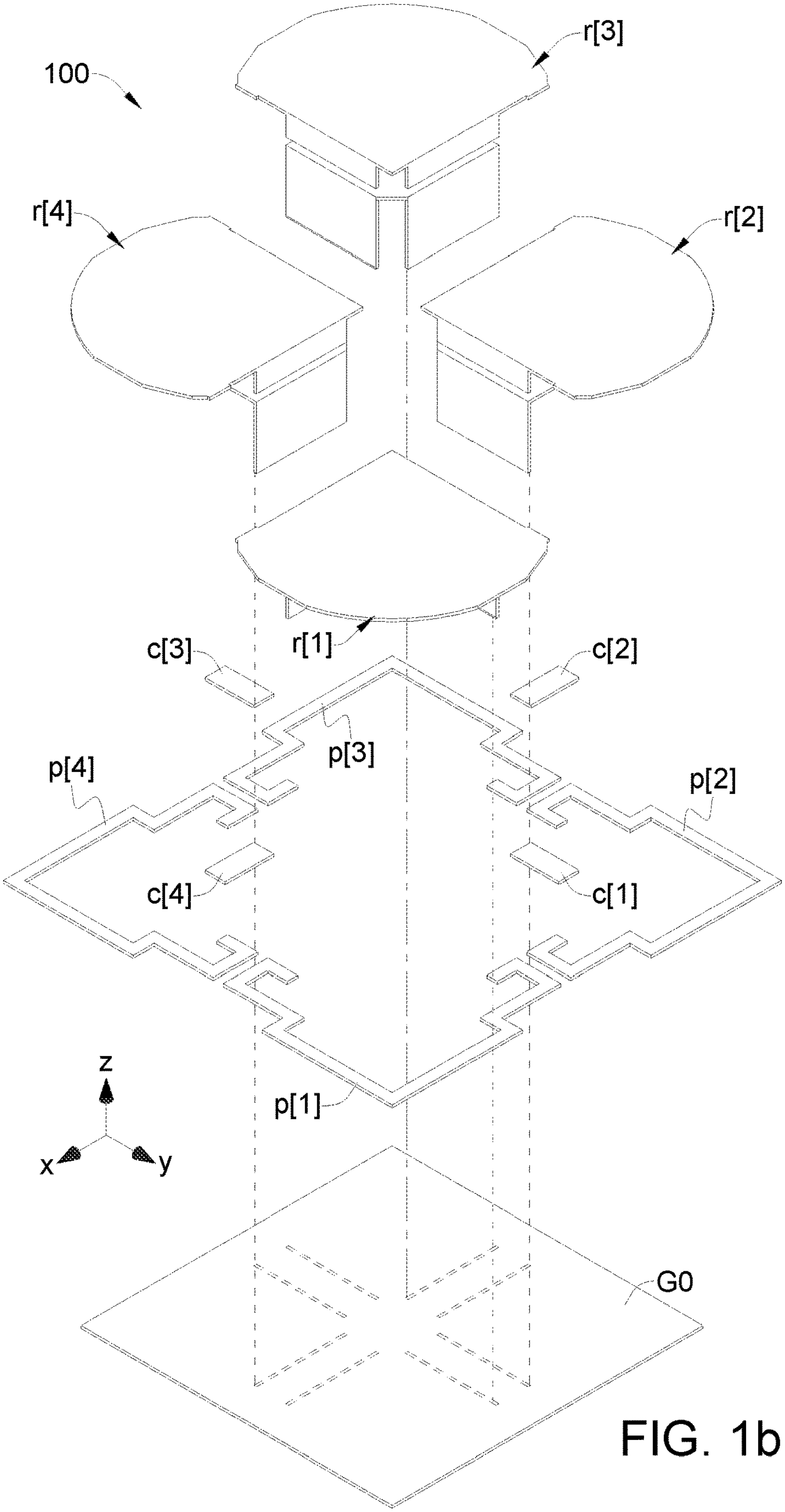
FIG. 1*b* depicts portions of the antenna, which may include radiators, parasitic elements and optional coupling elements.

FIG. 1*a* depicts a 3D view of an antenna 100 according to an embodiment of the invention, and FIG. 1*b* depicts an exploded view of the antenna 100. The antenna 100 may satisfy demands of advanced multi-broadband and multi-polarization communication standards, such as 5G mobile telecommunication at two separated FR2 bands with MIMO of dual-polarization diversity. Besides, the antenna 100 may also be compact in size to provide a high bandwidth-to-volume ratio.

As shown in FIGS. 1*a* and 1 *b*, the antenna 100 may include a plurality of mutually separated radiators, such as r[1] to r[4], which may jointly function as a plurality of dipoles. The antenna 100 may further include a plurality of conductive parasitic elements, such as p[1] to p[4]. Optionally, the antenna 100 may also include one or more conductive coupling elements, such as c[1] to c[4].

Each radiators r[n] (for n=1 to 4) may be conductive, and be conductively connected to a conductive ground plane G0 which may be a planar conductor parallel to xy-plane (note that the ground plane G0 depicted is just to demonstrate how the antenna 100 is disposed on the ground plane G0, not to limit the ground plane G0 to the depicted size and shape; parallel to xy-plane, the ground plane G0 may in fact extend wider beyond the depicted size). The parasitic elements p[1] to p[4] may be mutually separated (without mechanical interference and contact) and insulated, and each parasitic element p[n] (for n=1 to 4) may be separated and insulated from the radiators r[1] to r[4] and the ground plane G0. Each coupling element c[n] (for n=1 to 4), if included in the antenna 100, may be separated and insulated from the radiators r[1] to r[4], the parasitic elements p[1] to p[4] and the ground plane G0. Spaces separating the radiators r[1] to r[4], the parasitic elements p[1] to p[4] and the coupling elements c[1] to c[4] may be filled by dielectric material(s), e.g., air and/or nonconductive filler(s).

Figure 1C:
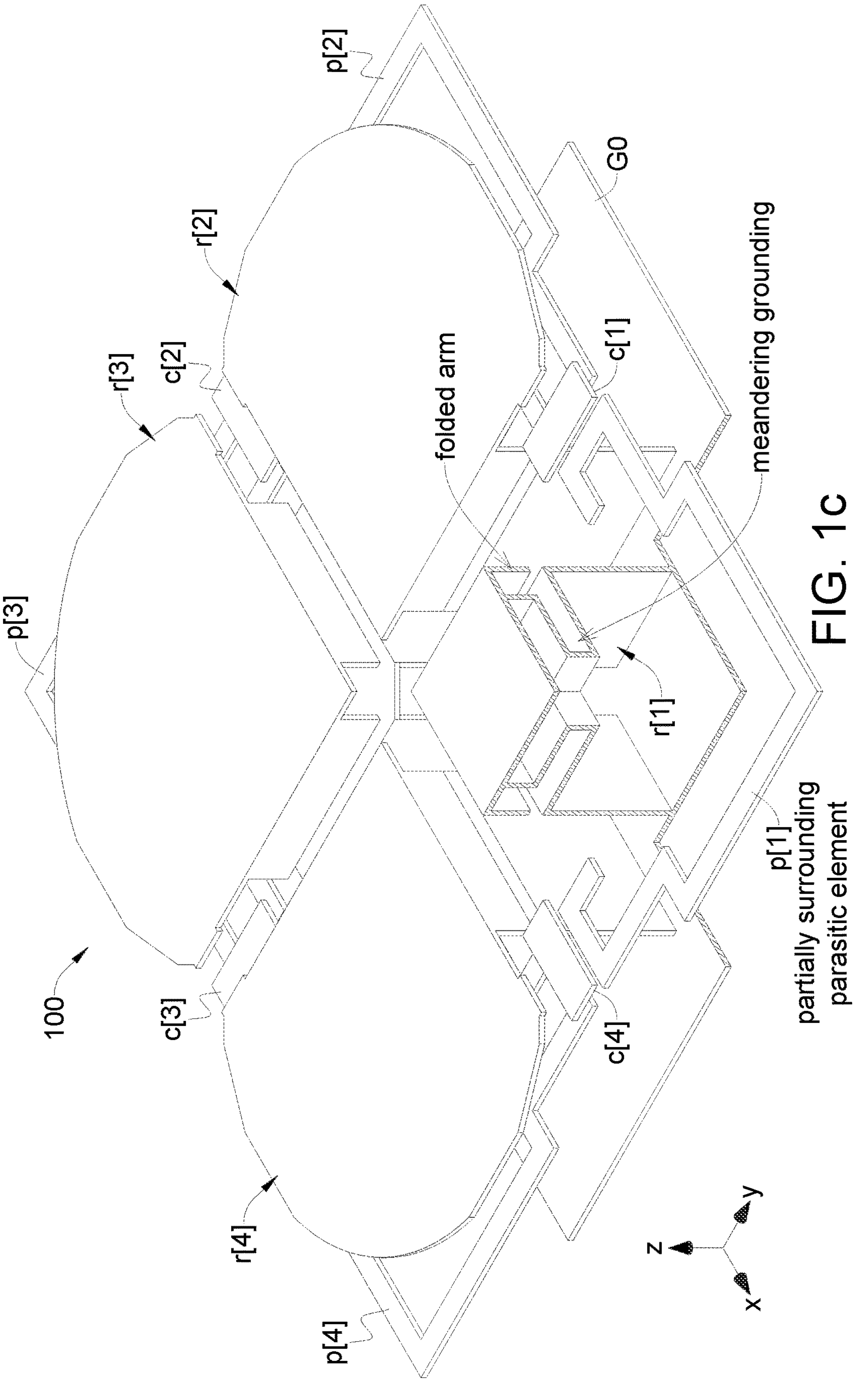
FIG. 1*c* demonstrates some features of the antenna.
Figure 1D:
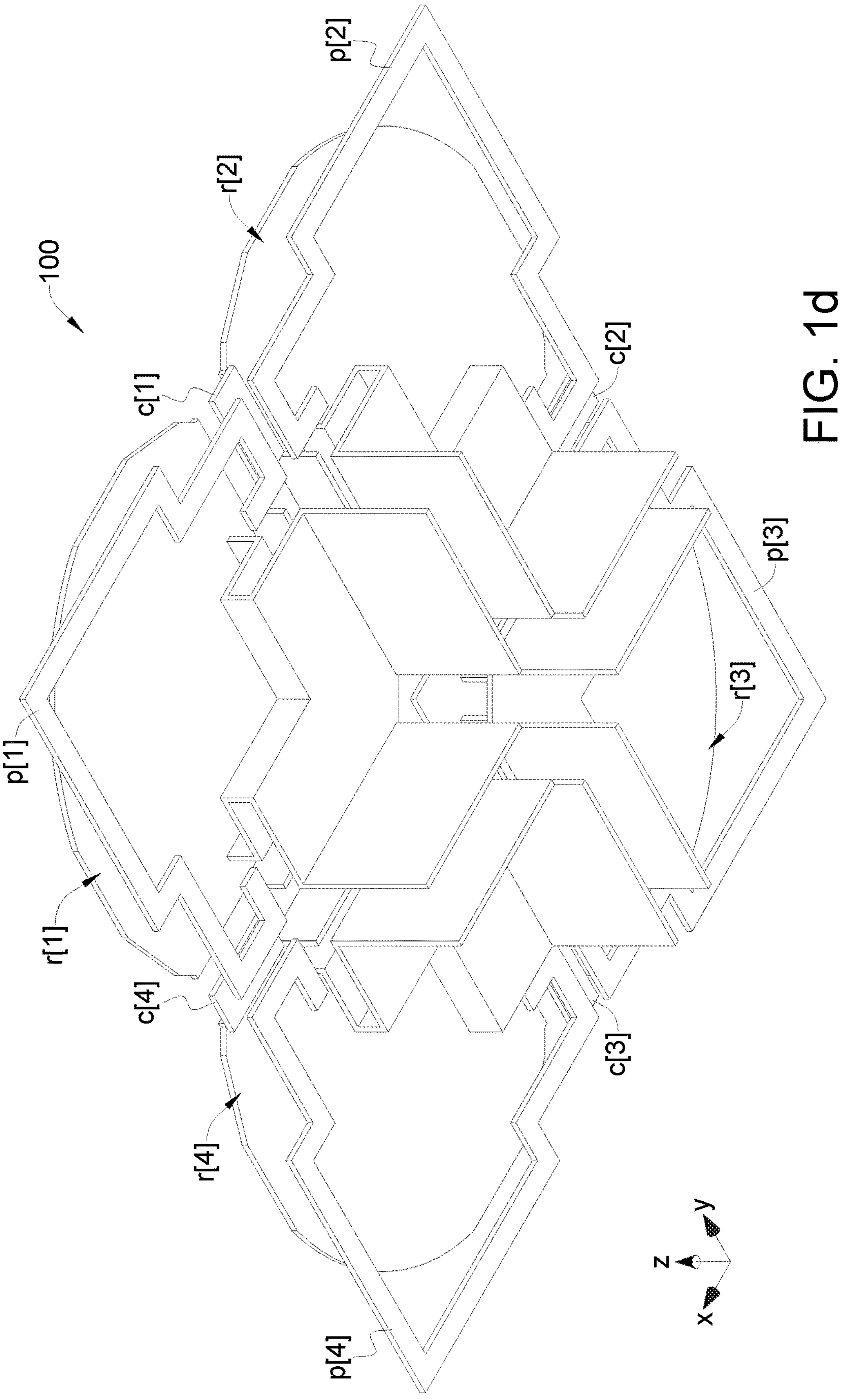
FIG. 1*d* depicts another 3D view of the antenna.
Figure 1F:
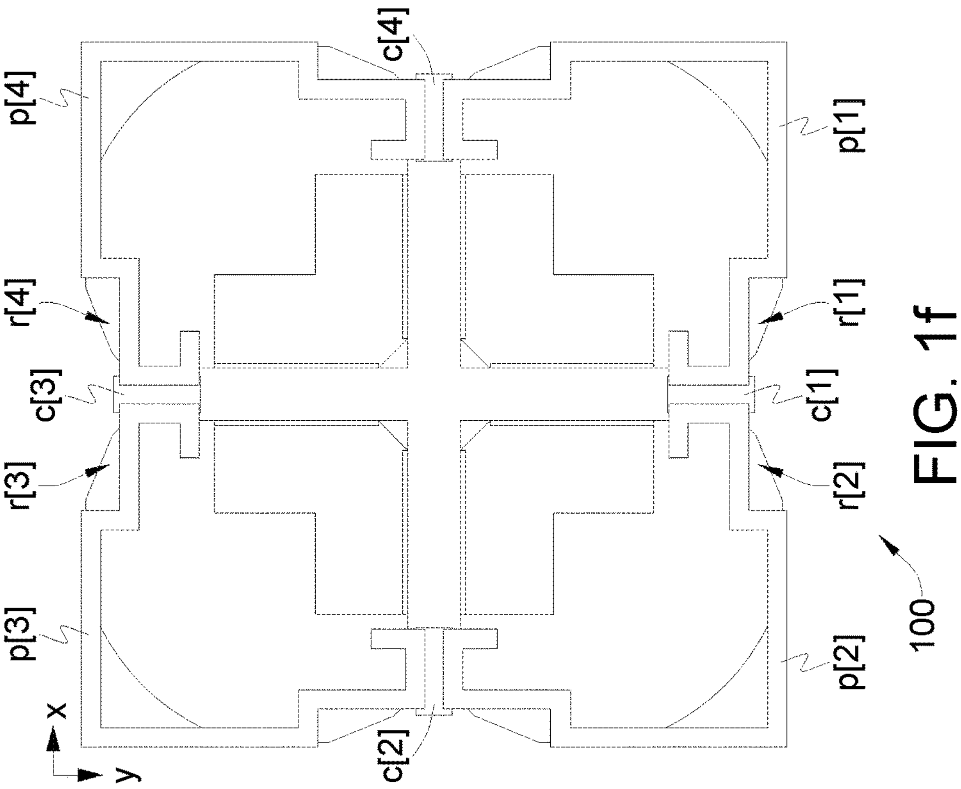
FIGS. 1*e* and 1*f* depict a top view and a bottom view of the antenna.
Figure 1E:
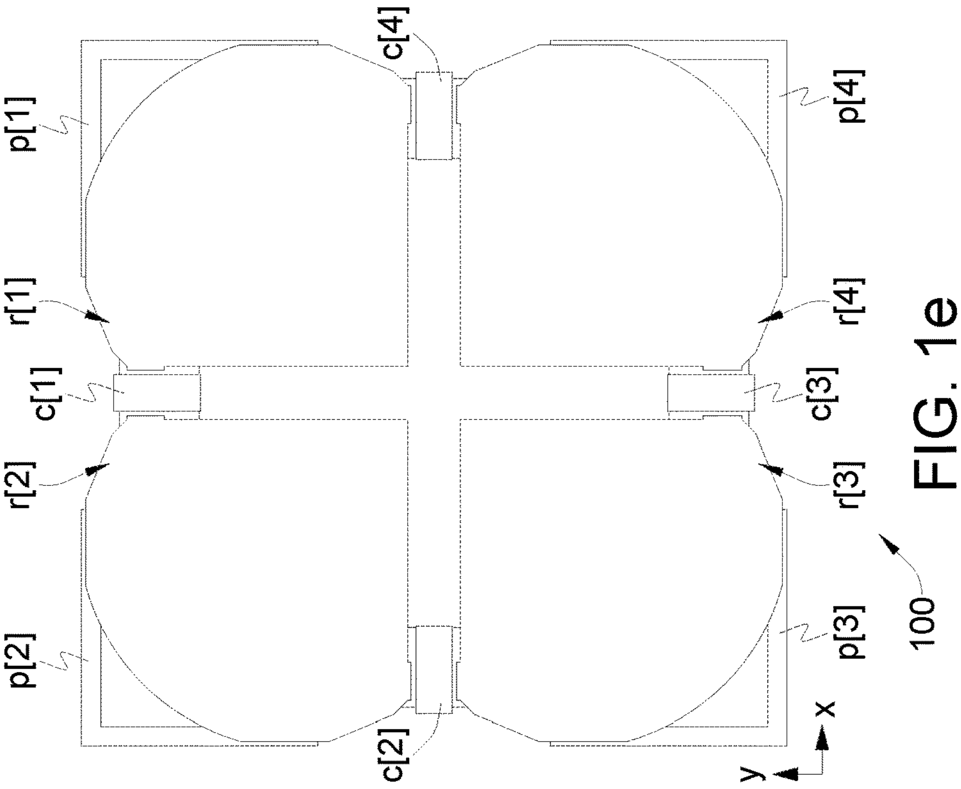

By a cross-section view of the antenna 100, FIG. 1*c* demonstrates some features of the antenna 100, such as folded arm, meandering grounding and the parasitic element p[n] partially surround each radiator r[n]; these features will be detailed later. As FIG. 1*a* depicts a high angle (above xy-plane) 3D view of the antenna 100, FIG. 1*d* depicts a low angle (below xy-plane) 3D view of the antenna 100, with the ground plane G0 hidden. FIGS. 1*e* and 1*f* respectively depict a top view and a bottom view of the antenna 100.

Figure 2A:
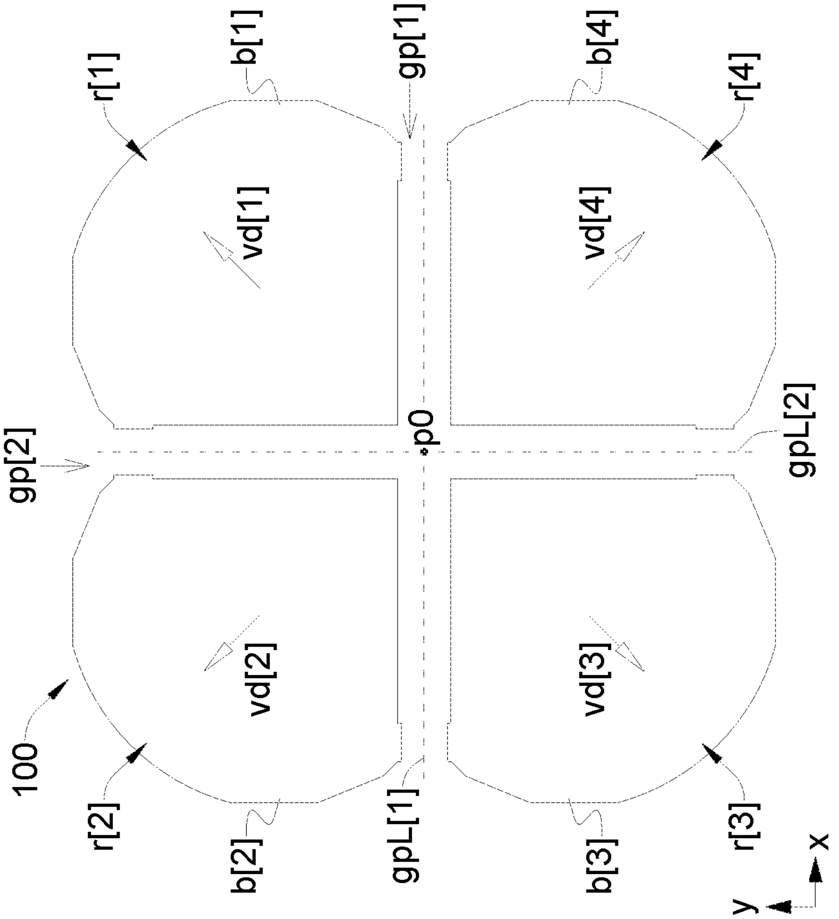
FIG. 2*a* depicts a top view of the radiators of the antenna.
Figure 2B:
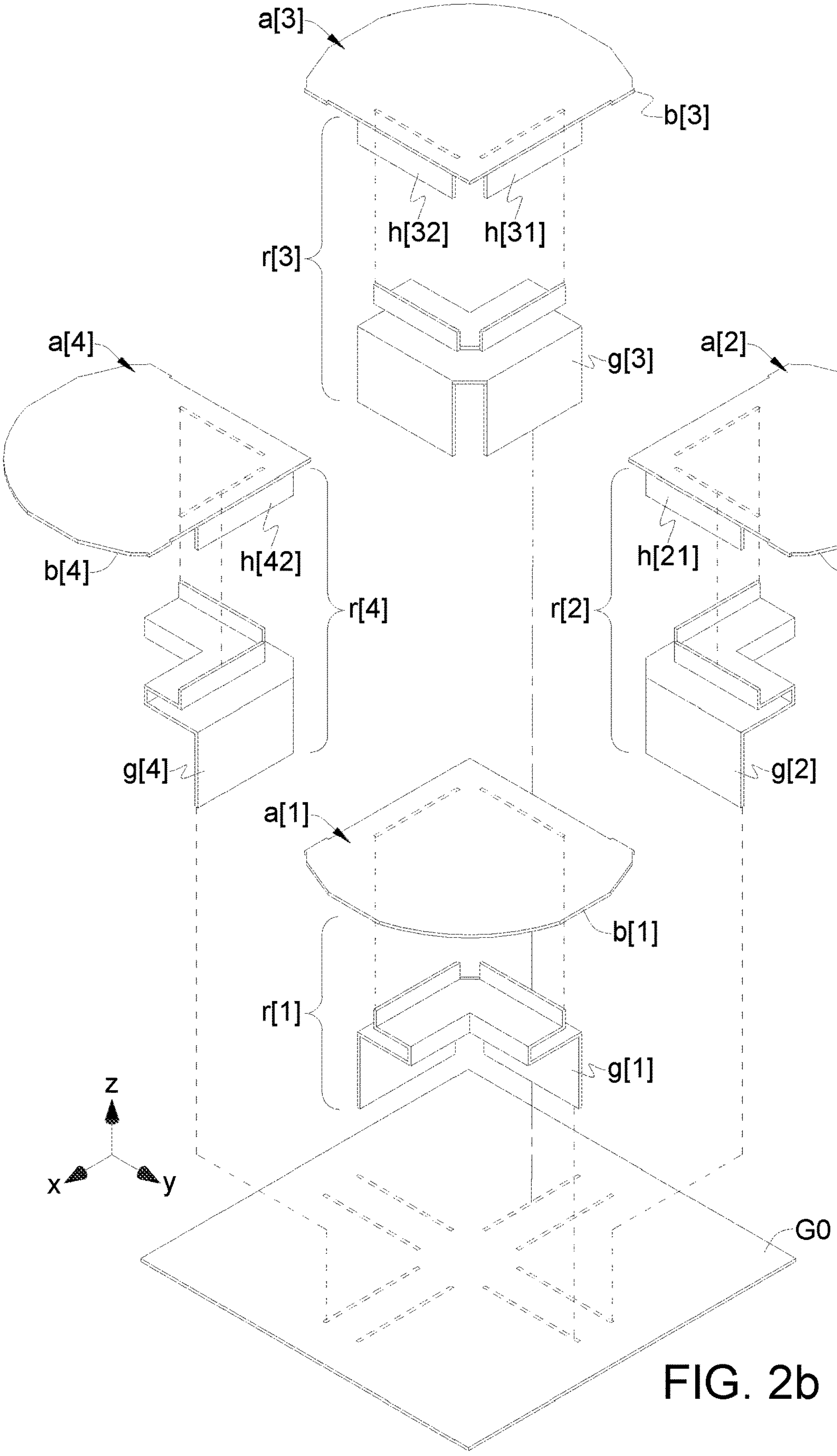
FIGS. 2*b* and 2*c* depict two 3D views of portions of the radiators, which may include arm plates, folded arms and ground walls.
Figure 2C:
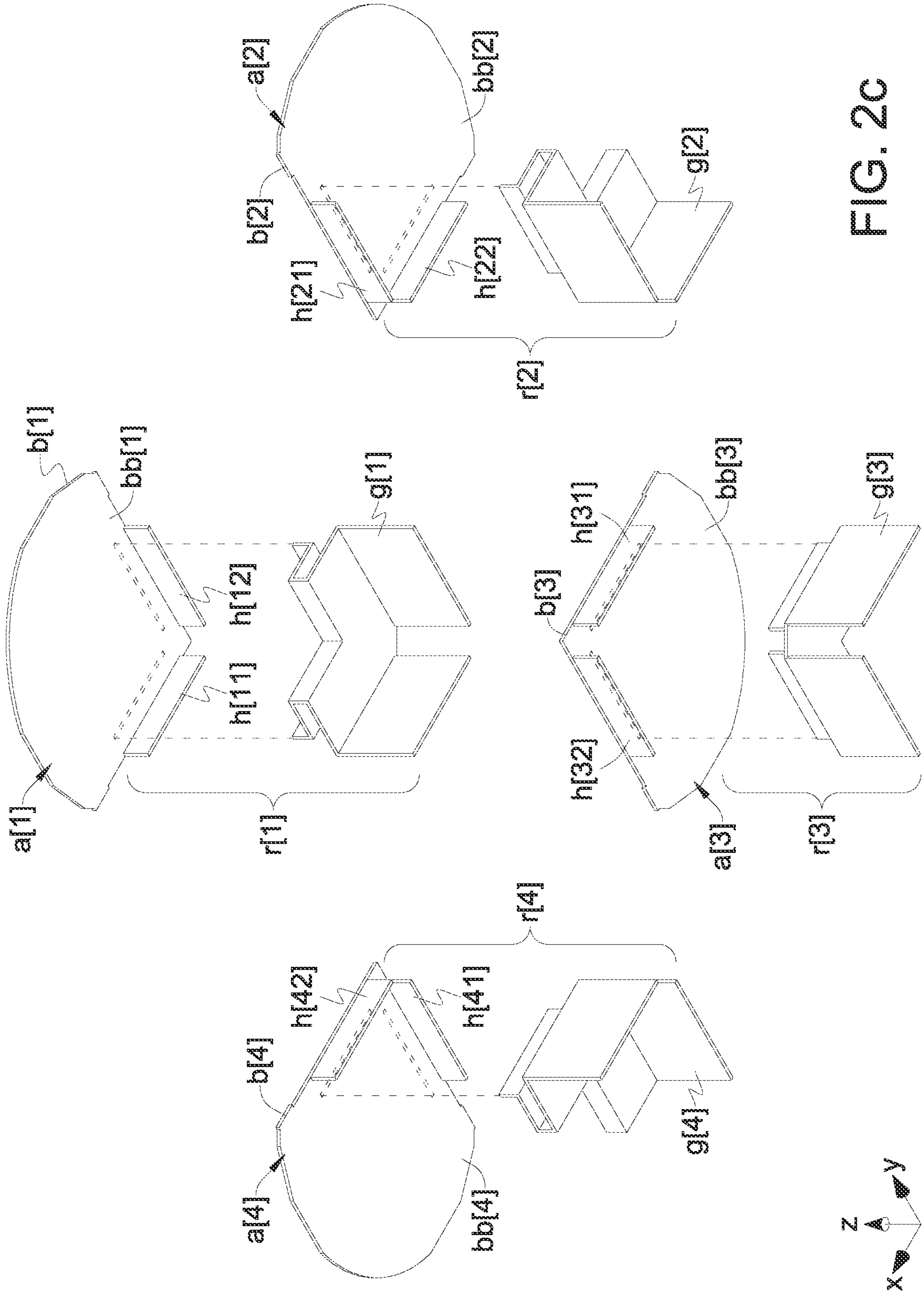

To demonstrate the radiators r[1] to r[4], FIG. 2*a* depicts a top view of the antenna 100 with the parasitic elements p[1] to p[4], the coupling elements c[1] to c[4] and the ground plane G0 hidden; FIGS. 2*b* and 2*c* depict portions of the radiators r[1] to r[4] respectively by a high angle 3D view and a low angle 3D view. As shown in FIG. 2*a*, on xy-plane, projections of the radiators r[1] to r[4] may surround a geometric origin p0 and may face toward four different directions vd[1] to vd[4]; for example, the directions vd[1] to vd[4] may respectively be 45, 135, 225 and 315 degrees rotated from x-direction. The radiators r[1] to r[4] may be separated by gaps gp[1] and gp[2] respectively extending along geometric lines gpL[1] and gpL[2]. For example, the radiators r[1] and r[2] may be at two opposite sides of the gap gp[2], the radiators r[2] and r[3] may be at two opposite sides of the gap gp[1], etc. Geometry (shapes, structure and sizes) of the radiators r[1] to r[4] may substantially be the same, though may have minor differences (e.g., for feeding, routing and/or mechanical design consideration, etc.) and/or variations (e.g., due to limited precision and accuracy of manufacture, etc.).

As shown in FIG. 2*b*, each radiator r[n] (for n=1 to 4) may include a conductive arm a[n] and a conductive ground wall g[n] connecting the conductive arm a[n] and the ground plane G0. As shown in FIG. 2*c*, each arm a[n] may include a conductive arm plate b[n] and one or more conductive folded arms, such as h[n1] and h[n2]. In an embodiment, the arm plate b[n] of each arm a[n] may be a planar conductor extending parallel to xy-plane; for example, in an embodiment, the antenna 100 may be implemented by a printed circuit board (PCB), and the arm plates b[1] to b[4] may be formed by a same metal layer. In an embodiment, each folded arm h[nk] (for k=1 to 2) of the arm a[n] may be a conductive wall extending outward (e.g., downward along negative z-direction) from a bottom surface bb[n] (FIG. 2*c*) of the arm plate b[n]. Each arm a[n] may therefore be "folded" because each folded arm h[nk] may be regarded as a downward folded extension of the arm plate b[n]. The folded structure of the arms a[1] to a[4] may help to enhance performances of the antenna 100; e.g., to expand bandwidth, to improve impedance matching, to reduce undesired tilt of radiation directivity and/or to increase XPD, etc.

Figure 2D:
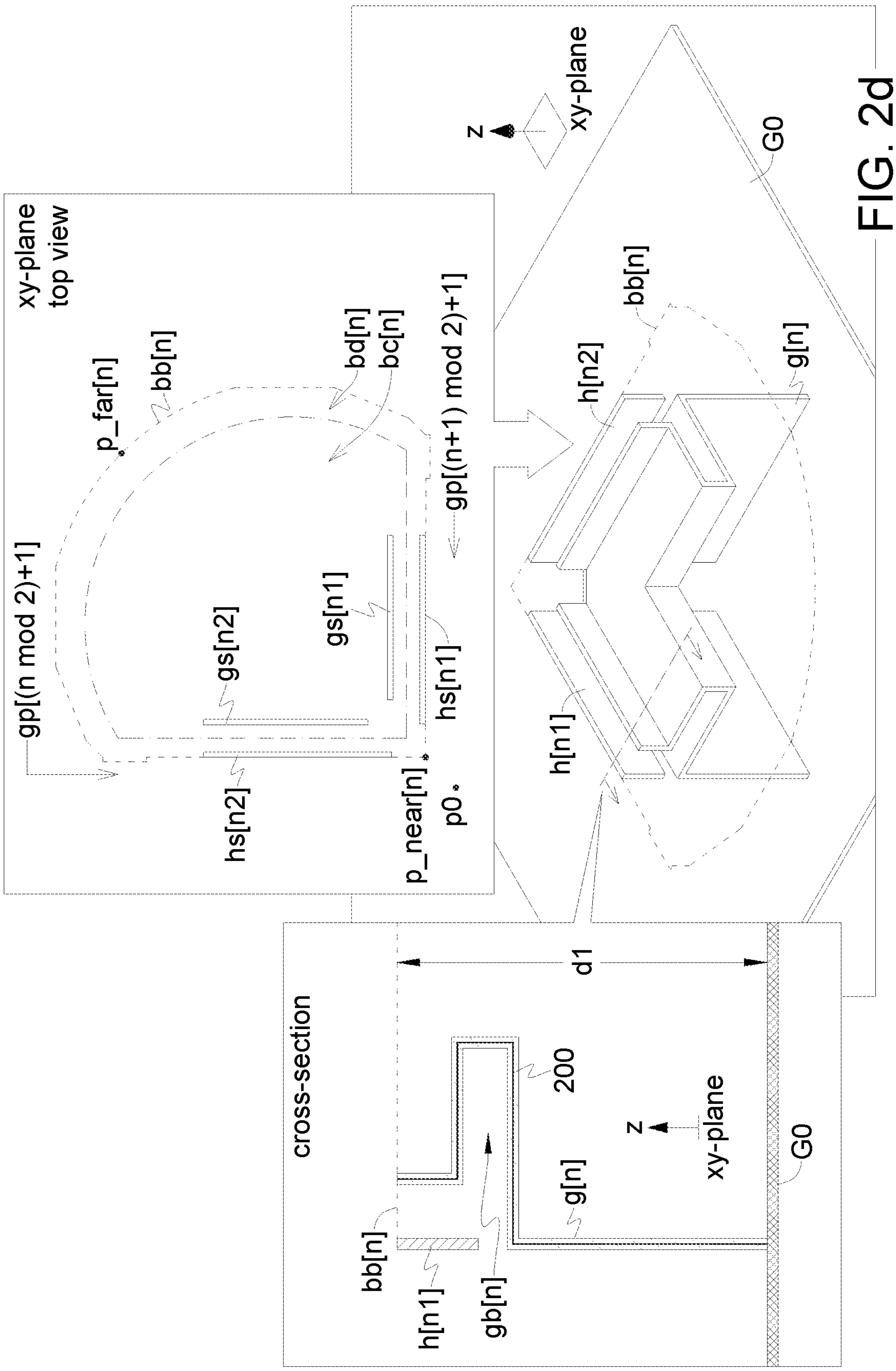
FIG. 2*d* depicts the folded arms and the ground wall of each radiator.

As shown in FIGS. 2*b* and 2*c*, while the folded arms h[n1] and h[n2] may extend downward from the bottom surface bb[n] (FIG. 2*c*) of the arm plate b[n], the ground wall g[n] of each radiator r[n] may also extend outward (e.g., downward along negative z-direction) from the bottom surface bb[n] of the arm plate b[n] to connect the ground plane G0 (FIG. 2*b*), but the folded arms h[n1] and h[n2] may be kept separated from the ground wall g[n]. FIG. 2*d* depicts arrangement of the folded arms h[n1], h[n2] and the ground wall g[n] by a high-angle 3D view, a cross-section view and a top view. As shown in the cross-section view of FIG. 2*d*, the ground wall g[n] may meander from the bottom surface bb[n] to the ground plane G0, and each folded arm h[nk] may be configured to be separated from the meandering ground wall g[n] and the ground plane G0.

As shown in the top view of FIG. 2*d*, the ground wall g[n] may extend downward from sites gs[n1] and gs[n2] of the bottom surface bb[n], and the folded arms h[n1] and h[n2] may extend downward from sites hs[n1] and hs[n2] of the bottom surface bb[n]. In an embodiment, on xy-plane, a projection of each of the sites gs[n1] and gs[n2] and a projection of each of the sites hs[n1] and hs[n2] may be arranged not to overlap.

In an embodiment, on xy-plane, the projection of the site hs[nk] (for k=1 to 2) may be placed closer to a boundary of a projection of the bottom surface bb[4], comparing to the projection of the site gs[nk]. That is, on xy-plane, the projection of each site gs[nk] (for k=1 to 2) may be placed in an inner geometric region bc[n] which may be inside a projection of the arm plate b[n] (i.e., the projection of the bottom surface bb[n]), and the projection of each site hs[nk] may be in a peripheral geometric region bd[n] between a boundary of the inner geometric region bc[n] and a boundary of the projection of the arm plate b[n], wherein the boundary of the inner geometric region bc[n] and the boundary of the projection of the arm plate b[n] may be arranged not to intersect.

In an embodiment, on xy-plane, the projection of the site hs[nk] may be arranged close to a nearby gap gp[m] with m=((n+k) mod 2))+1 (for n=1 to 4 and k=1 to 2); e.g., the projection of the site hs[nk] may be arranged between the projection of the site gs[nk] and the gap gp[m]. For example, the projection of the site hs[11] may be arranged between the projection of the site gs[11] and the gap gp[1], and the projection of the site hs[12] may be arranged between the projection of the site gs[12] and the gap gp[2].

In an embodiment, on xy-plane, the projection of the site hs[nk] may be arranged near the geometric origin p0; e.g., the projection of the site hs[nk] may be arranged closer to a near point p_near[n] comparing to a far point p_far[n], wherein the origin p0 may also be a geometric center of the projections of the arm plates b[1] to b[4] (i.e., the projections of the bottom surfaces bb[1] to bb[4]), and the points p_near[n] and p_far[n] may be two geometric points, on the boundary of the projection of the bottom surface bb[n], which are respectively closest to and farthest from the origin p0. For example, in an embodiment, the site hs[nk] may be configured such that, on the boundary of the projection of the site h[nk], there may exist (at least) one geometric point ph[n] (not shown) which may cause a distance between said geometric point ph[n] and the near point p_near[n] to be shorter than a distance between said geometric point ph[n] and the far point p_far[n].

Figure 2E:
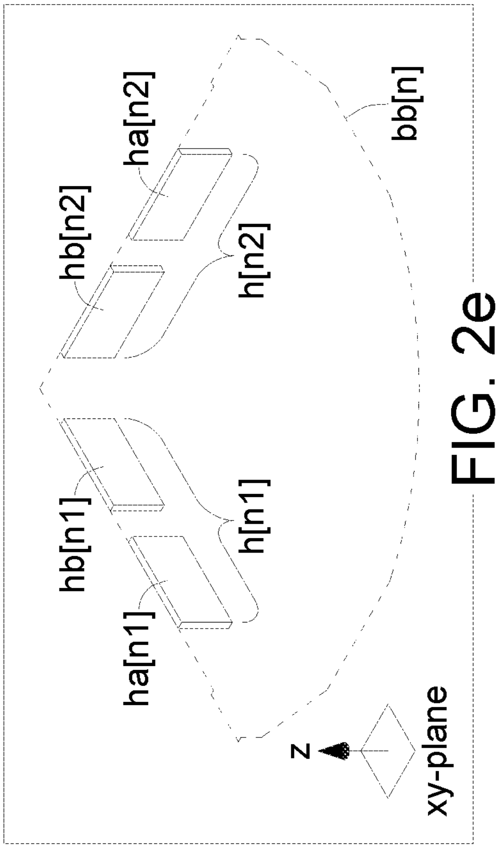
FIGS. 2*e* to 2*h* depict the folded arms according to different embodiments of the invention.
Figure 2F:
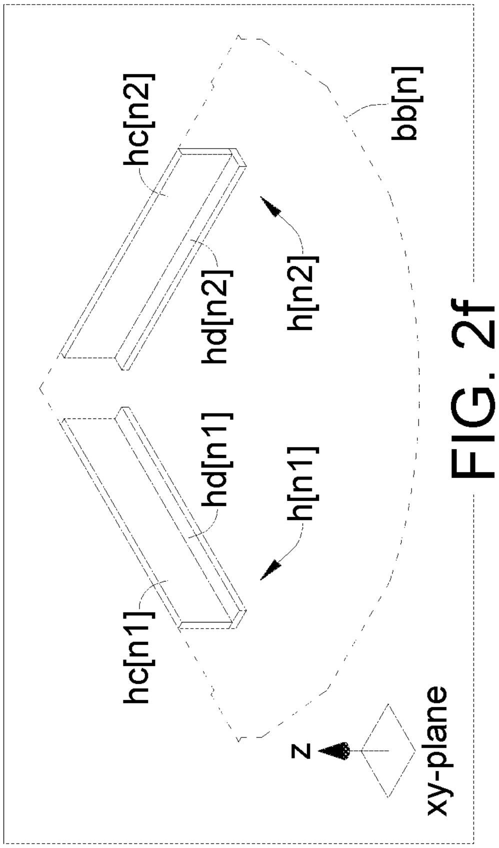
Figure 2G:
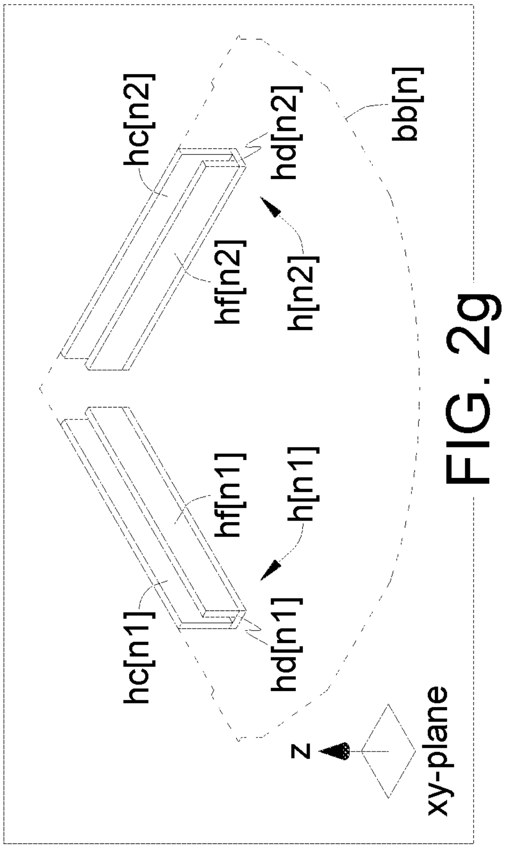

In the embodiment depicted in FIGS. 2*b* to 2*d*, the folded arm h[nk] of each arm a[n] may simply be a conductive wall; however, the invention is not so limited. FIGS. 2*e* to 2*g* demonstrate more embodiments of the folded arms h[n1] and h[n2] of each arm a[n]. As shown in FIG. 2*e*, in an embodiment, each folded arm h[nk] (for k=1 to 2) may include two (or more) separated walls, such as ha[nk] and hb[nk]. As shown in FIG. 2*f*, in an embodiment, each folded arm h[nk] (for k=1 to 2) may include an extension plate hd[nk] and an extension wall hc[nk] connecting the bottom surface bb[n] of the arm plate b[n] and the extension plate hd[nk], wherein the extension plate hd[nk] may be a planar conductor parallel to the arm plate b[n] (FIGS. 2*a* to 2*c*) but be separated from the arm plate b[n], and the extension wall hc[nk] may be conductive. As shown in FIG. 2*g*, in an embodiment, besides the extension wall hc[nk] and the extension plate hd[nk], each folded arm h[nk] may further include another conductive extension wall hf[nk] which may extend outward (e.g., upward or downward) from a top or bottom surface of the extension plate hd[nk], and may be separated from the bottom surface bb[n] of the arm plate b[n] and the extension wall hc[nk].

Figure 2H:
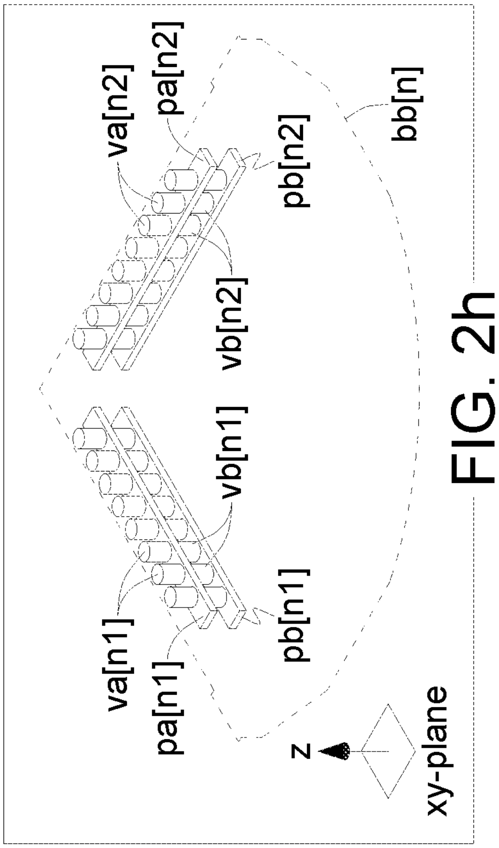

As the antenna 100 may be implemented by a PCB, each folded arm h[nk] may be formed by serially interlacing one or more layers of conductive vias and one or more conductive plates respectively formed by one or more metal layers. For example, as shown in FIG. 2*h* which depicts an embodiment of the folded arms h[n1] and h[n2], each folded arm h[nk] (for k=1 to 2) may be formed by stacking a first layer of vias va[nk], a first plate pa[nk], a second layer of vias vb[nk] and a second plate pb[nk]. Similarly, each of the walls ha[nk], hb[nk] (FIG. 2*e*), hc[nk] (FIGS. 2*f* and 2G) and hf[nk] (FIG. 2G) may be formed by interlacing layer(s) of conductive vias and conductive plate(s). In the embodiments depicted in FIGS. 2*a* to 2*h*, the folded arm h[nk] may extend downward (along negative z-direction) from the bottom surface bb[n] of the arm plate b[n]; however, in other embodiments (not shown), each folded arm h[nk] may extend upward (along positive z-direction) from a top surface, which is opposite to the bottom surface bb[n], of each arm plate b[n].

As shown in the cross-section view of FIG. 2*d*, the ground wall g[n] of each radiator r[n] may include a meandering portion gb[n], and the meandering portion gb[n] may cause a distance d1, which is measured between the bottom surface bb[n] of the arm b[n] and a top surface of the ground plane G0, to be shorter than a length of a (e.g., shortest) current conduction path 200 which routes along the ground wall g[n] from the bottom surface bb[n] of the arm plate b[n] to the top surface of the ground plane G0. The meandering portion gb[n] may help to improve performances of the antenna 100, e.g., to reduce sizes of the antenna 100 and to increase bandwidth-to-volume ratio, etc. Because antenna design may desire the conduction path 200 to have a preferred length LO (not shown), if the ground wall g[n] extends downward from the bottom surface bb[n] of the arm plate b[n] to the ground plane G0 alone a straight line without meandering, the distance d1 would have to equal the preferred length LO and would therefore cause the antenna to occupy a larger volume. However, by arranging the ground wall g[n] to meander as shown in FIG. 2*d*, the distance d1 may be shortened to be much shorter than the preferred length LO, and the overall volume of the antenna 100 may therefore be decreased.

Figure 3A:
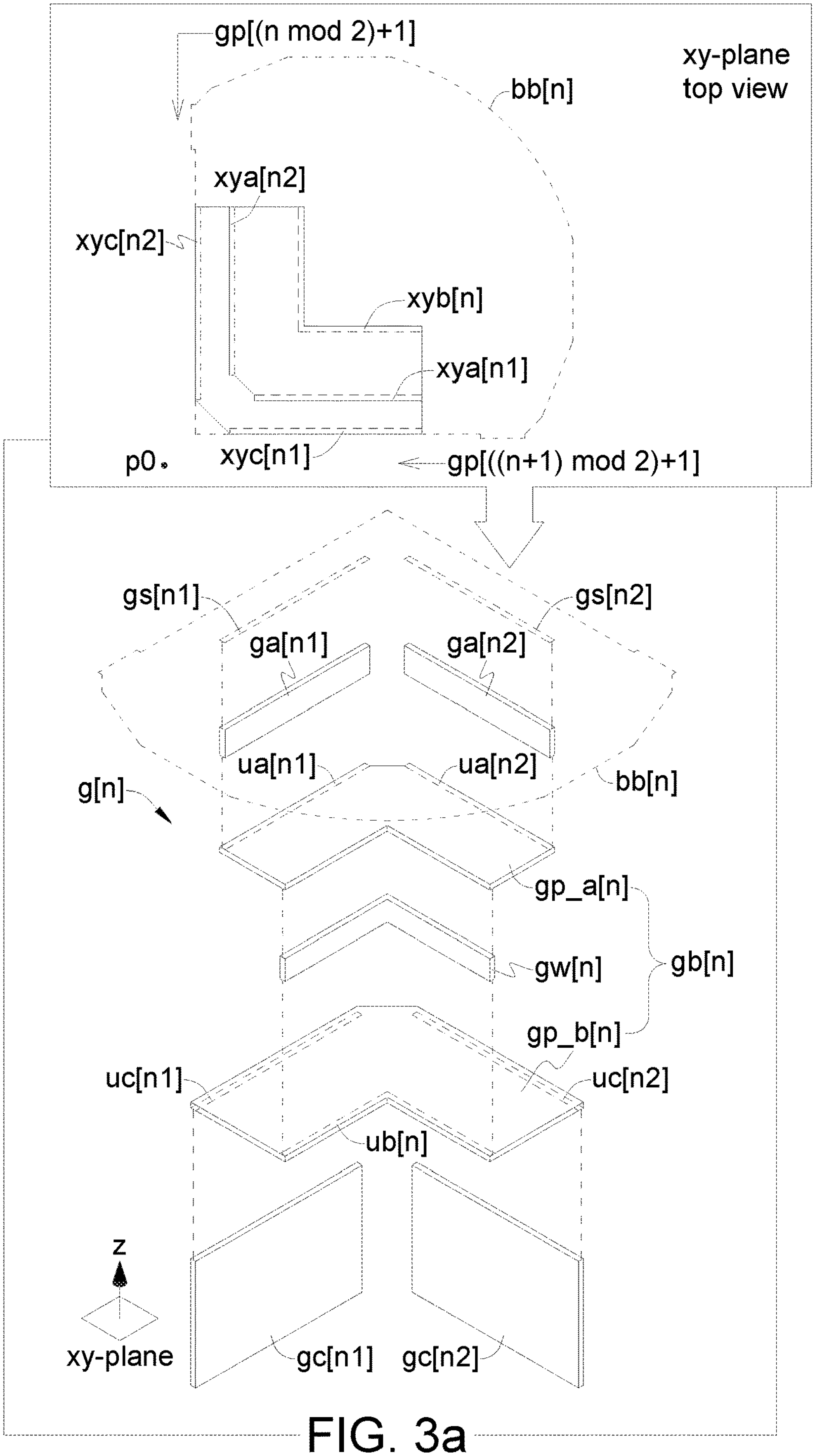
FIG. 3*a* depicts portions of each ground wall.

Along with FIG. 2*d*, FIG. 3*a* depicts portions of each ground wall g[n] by a high angle 3D view and a top view. Besides the meandering portion gb[n], the ground wall g[n] may further include first support walls ga[n1] and ga[n2], as well as second support walls gc[n1] and gc[n2]. The walls ga[n1] and ga[n2] may be conductive, and may connect the bottom surface bb[n] of the arm plate b[n] and a top surface of the meandering portion gb[n]. The walls gc[n1] and gc[n2] may conductive, and may connect a bottom surface of the meandering portion gb[n] and the top surface of the ground plane G0.

As shown in FIG. 3*a*, in an embodiment, the meandering portion gb[n] may include a first step plate gp_a[n], a second step plate gp_b[n] and a connection wall gw[n]. The plate gp_a[n] may be a planar conductor parallel to xy-plane, and may be connected to the walls ga[n1] and ga[n2] respectively at sites ua[n1] and ua[n2] of a top surface of the plate gp_a[n]. The plate gp_b[n] may a planar conductor parallel to xy-plane, and may be connected to the walls gc[n1] and gc[n2] at sites uc[n1] and uc[n2] of a bottom surface of the plate gp_b[n]. The wall gw[n] may be conductive, and may connect a bottom surface of the plate gp_a[n] and a site ub[n] of a top surface of the plate gp_b[n].

As shown in the top view of FIG. 3*a*, in an embodiment, on xy-plane, a projection xyb[n] of the connection wall gw[n] (e.g., a projection of the site ub[n]) may be arranged not to overlap with projections xya[n1], xya[n2], xyc[n1] and xyc[n2] of the walls ga[n1], ga[n2], gc[n1] and gc[n2] (e.g., projections of the sites ua[n1], ua[n2], uc[n1] and uc[n2]). Also, in an embodiment, each of the projections xya[n1] and xya[n2] (e.g., each of the projections of the sites gs[n1] and gs[n2]) and anyone of the projections xyc[n1] and xyc[n2] may be arranged not to overlap.

Figure 3B:
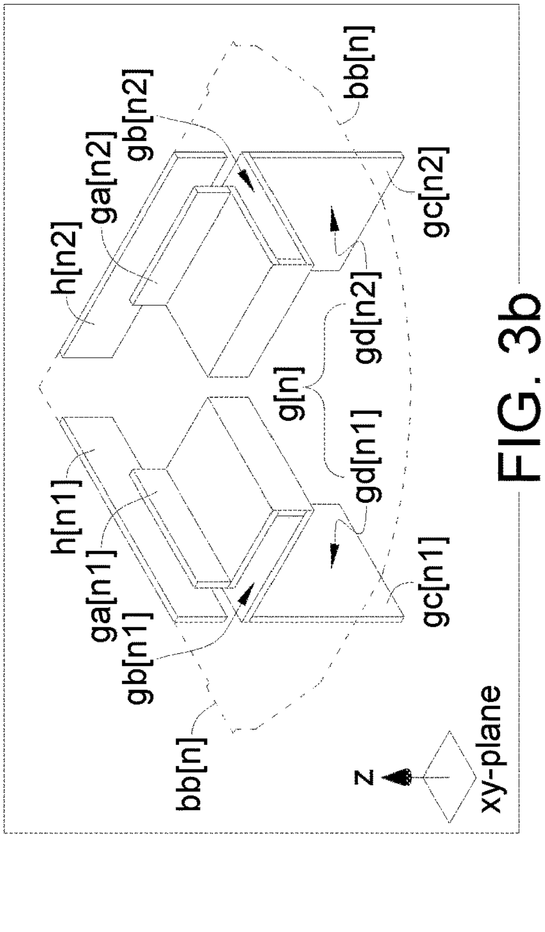
FIGS. 3*b* to 3*e* depict the ground wall according to different embodiments of the invention.

In addition to the embodiment depicted in FIGS. 2*d* and 3*a*, FIGS. 3*b* to 3*e* depict more embodiments of the ground wall g[n] according to the invention. As shown in FIG. 3*b*, in an embodiment, the ground wall g[n] may include multiple mutually separated parts, such as gd[n1] and gd[n2]; each part gd[nk] (for k=1 to 2) may have a meandering portion gb[nk]. On the other hand, in an embodiment (not depicted), the separated walls ga[n1] and ga[n2] in FIG. 3*a* may be combined to one joint wall, and/or the separated walls gc[n1] and gc[n2] may be combined to one joint wall.

Figure 3C:
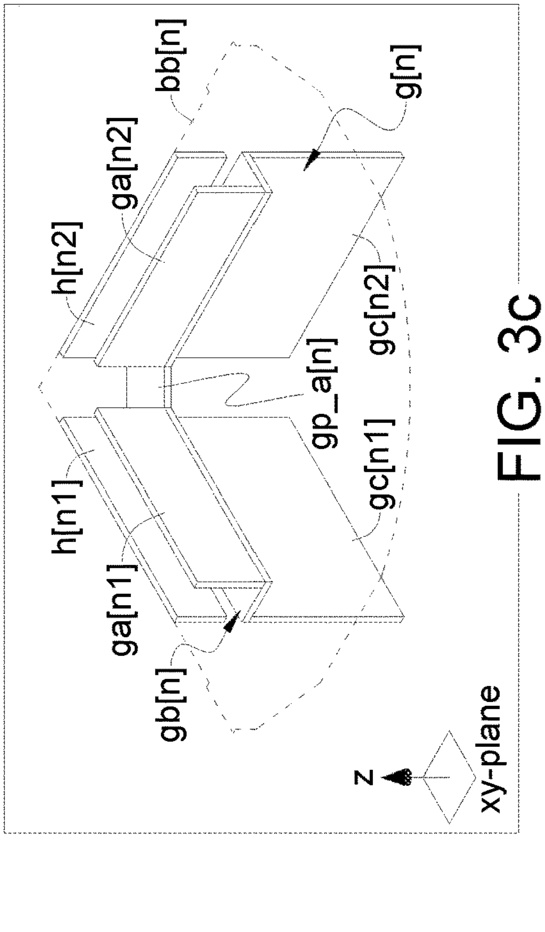
Figure 3D:
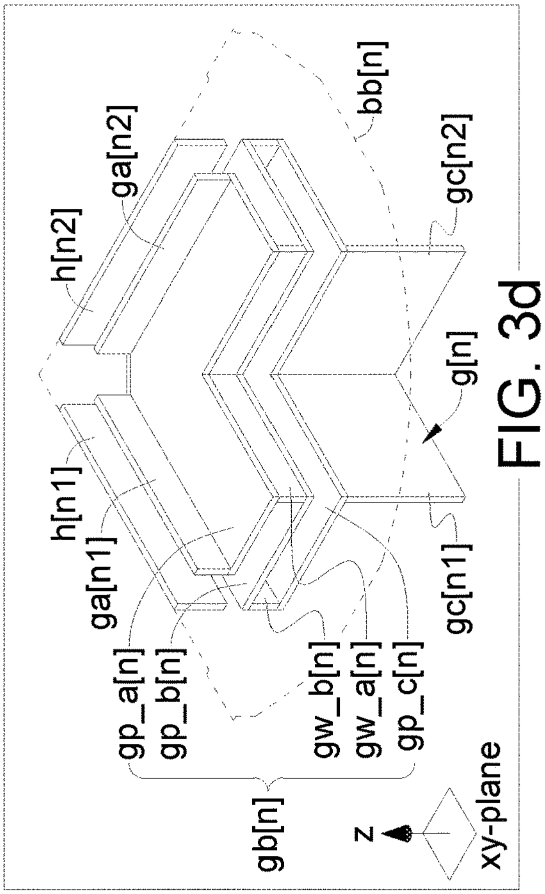
Figure 3E:
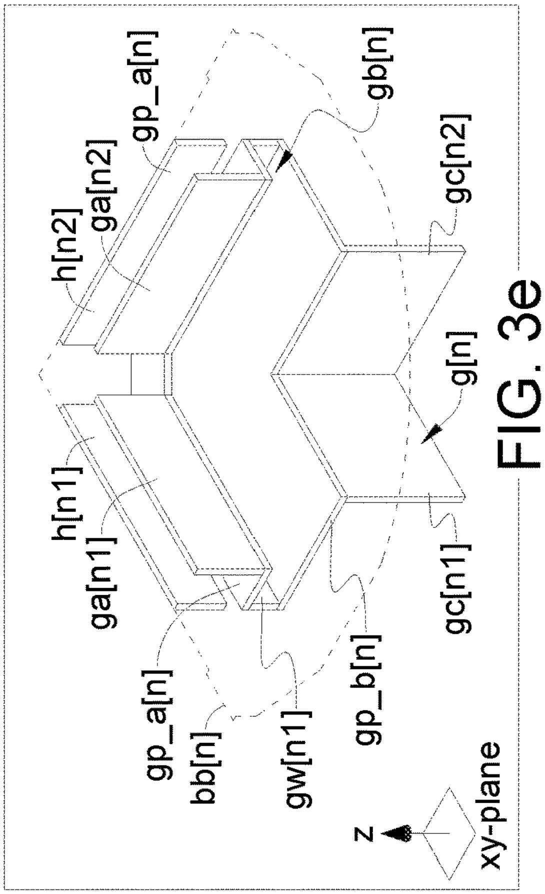
Figure 4B:
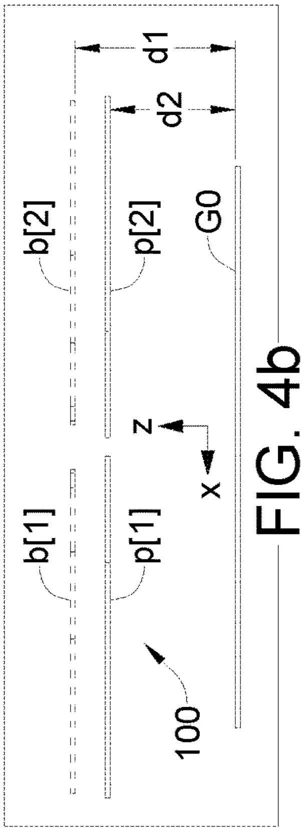
FIGS. 4*a* and 4*b* depict different views of the parasitic elements.
Figure 4C:
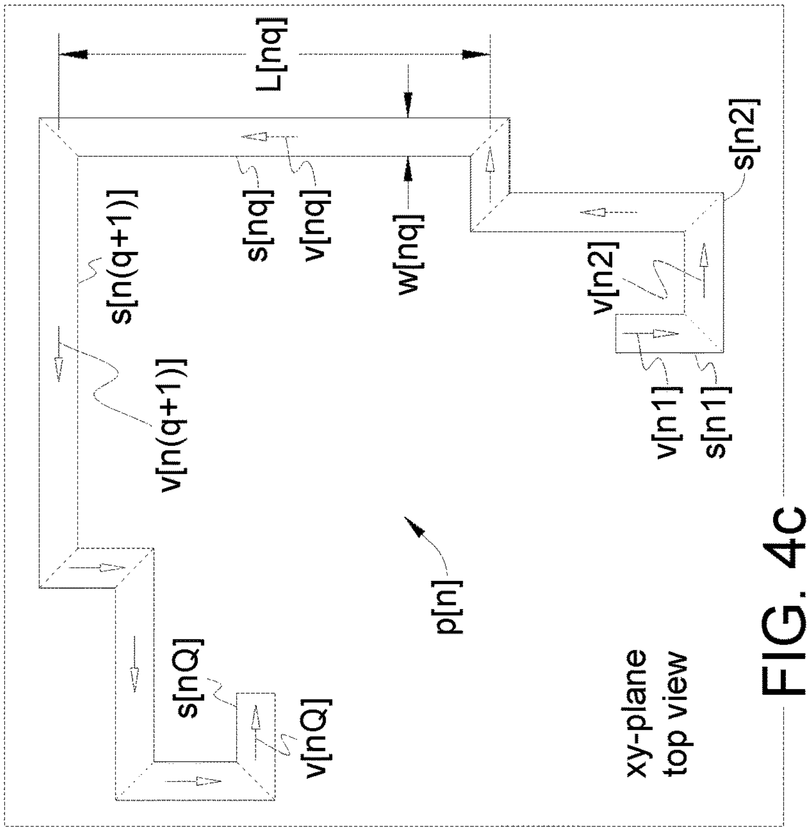
FIG. 4*c* depicts a top view of each parasitic element.
Figure 4A:
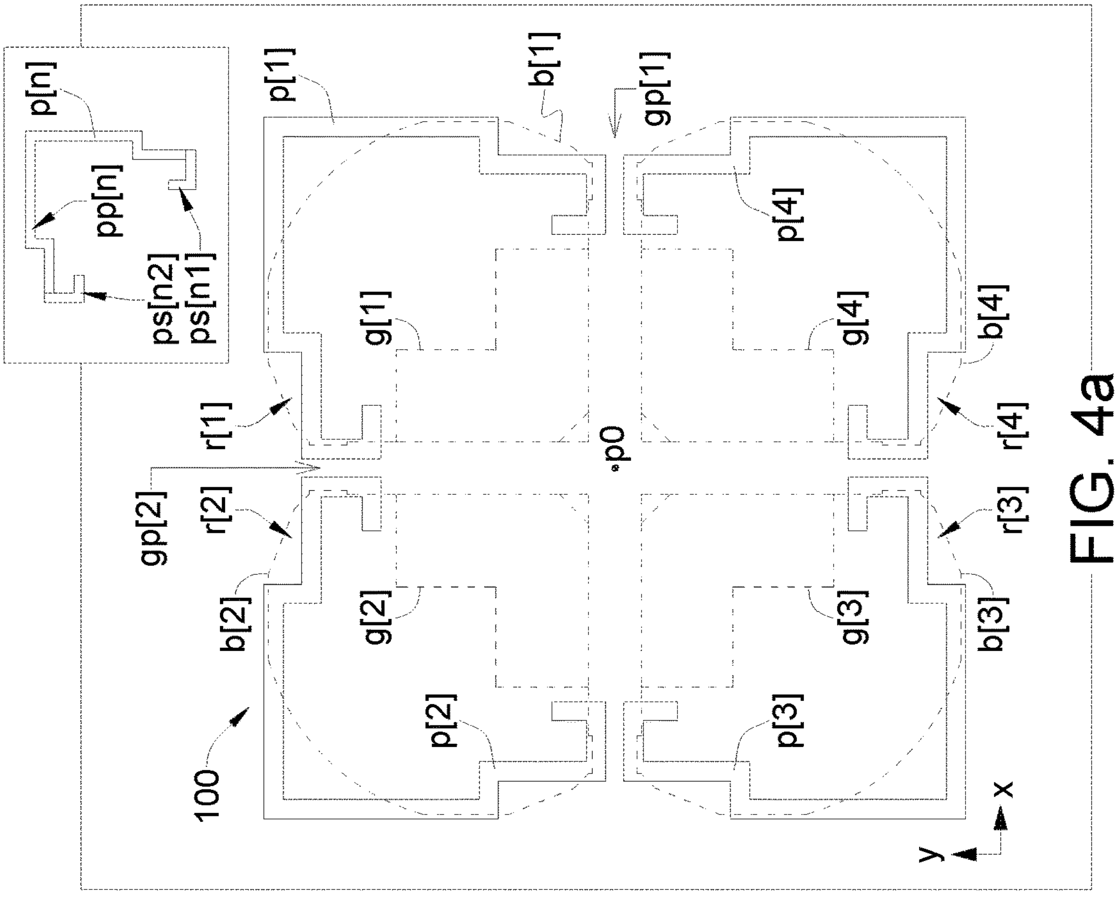
Figure 4G:
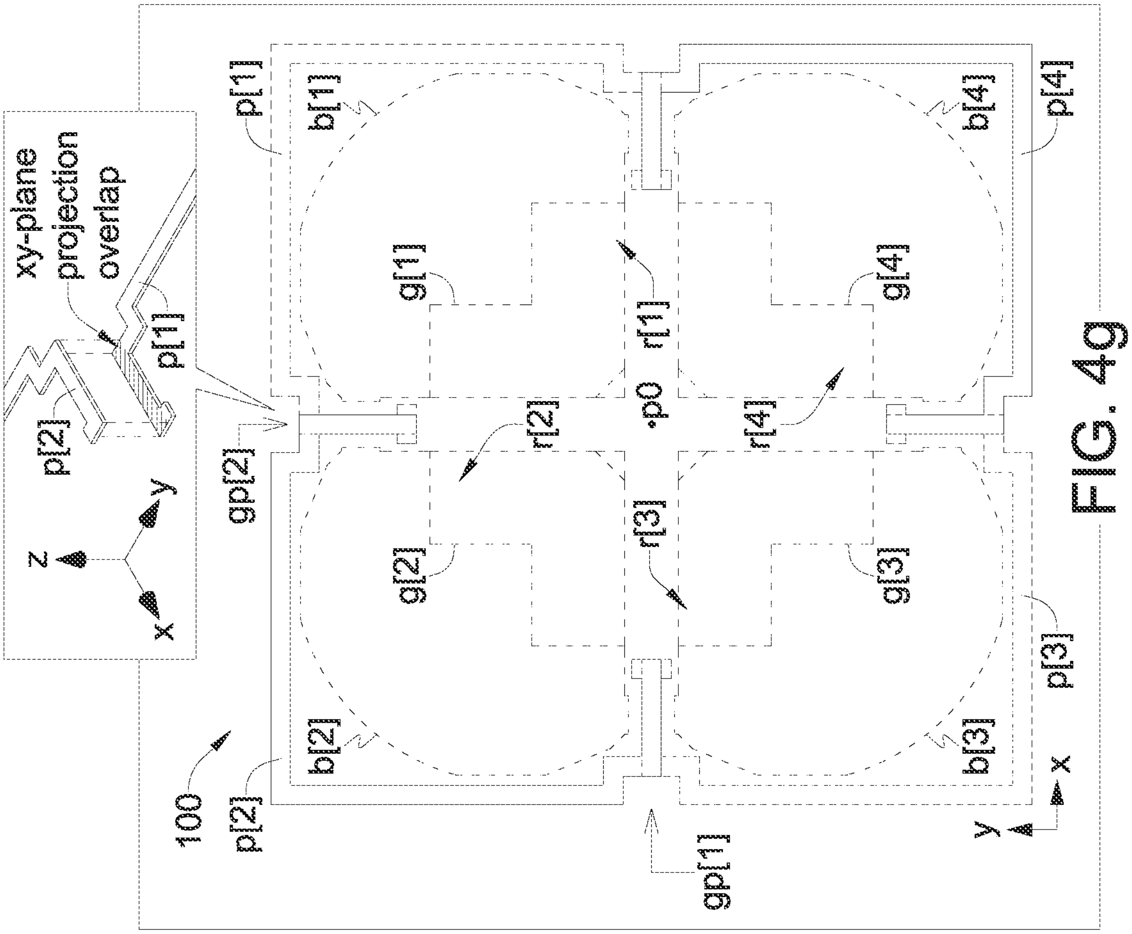
FIGS. 4*d* to 4*g* depict the parasitic elements according to different embodiments of the invention.
Figure 4D:
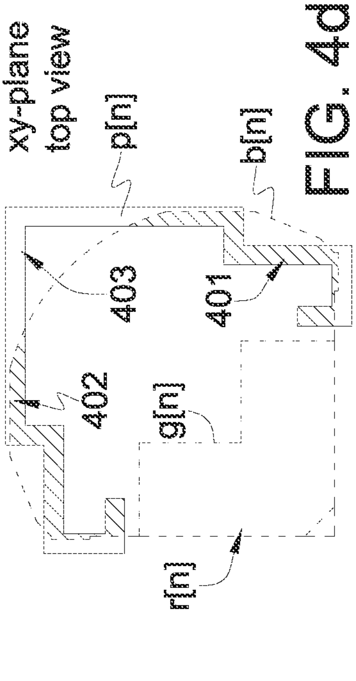
Figure 4E:
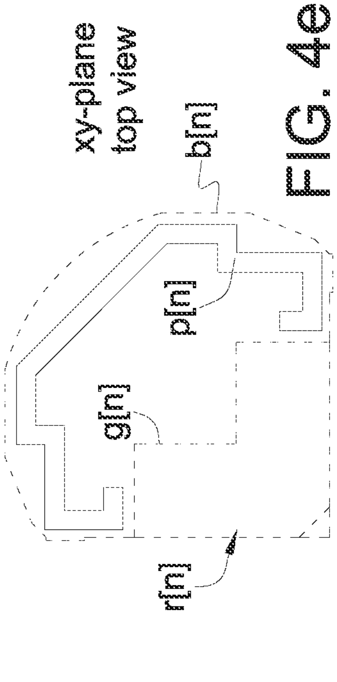
Figure 4F:
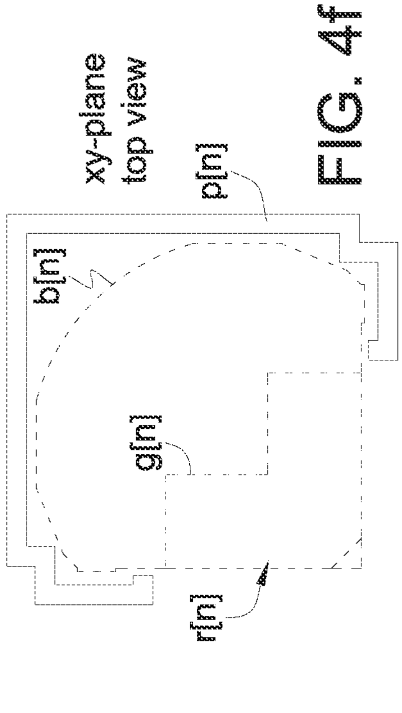

By reconfiguring structure of the meandering portion gb[n] of each ground wall g[n], the conduction path 200 (FIG. 2*d*) of the ground wall g[n] may have fewer or more turns. For example, as shown in FIG. 3*c*, in an embodiment, the meandering portion gb[n] of the ground wall g[n] may be simplified to have only one single plate gp_a[n] connected between the walls ga[nk] and gc[nk]. On the other hand, as shown in FIG. 3*d*, in an embodiment, the meandering portion gb[n] of the ground wall g[n] may include more than two step plates, such as gp_a[n], gp_b[n] and gp_c[n], and more than one connection walls, such as gw_a[n] and gw_b[n], connecting every two adjacent step plates.

As shown in FIGS. 2*d* and 3*a*, the meandering portion gb[n] of the ground wall g[n] may form a U-shaped turn with its opening directed toward each folded arm h[nk]; however, as shown in FIG. 3_e_, in an embodiment, the meandering portion gb[n] of the ground wall g[n] may form a U-shaped turn with its opening directed away from each folded arm h[nk]. In an embodiment, the antenna 100 may be implemented by a PCB, and each of the walls ga[nk], gw[n] and gc[nk] (FIG. 3_a_) may be formed by interlacing layer(s) of conductive vias and conductive plate(s), similar to FIG. 2_h_.

FIG. 4_a_ depicts an embodiment of the parasitic elements p[1] to p[4] by a top view of the antenna 100 (with the ground plane G0 and the coupling elements c[1] to c[4] hidden). Each parasitic element p[n] may be a planar conductive path parallel to xy-plane. On xy-plane, as the projection of each radiator r[n] (e.g., the projection of the arm plate b[n]) may be clamped between the two gaps gp[1] and gp[2] similar to a sector (not shown) clamped between two radii, in an embodiment, a projection of the parasitic element p[n] may also extend between the two gaps gp[1] and gp[2] which clamp the radiator r[n], and may therefore partially surround the radiator r[n] (e.g., the ground wall g[n], shown by outline in FIG. 4_a_ for conciseness) by an boomerang-shaped middle segment pp[n] between two claw-like radial segments ps[n1] and ps[n2] pointing toward a center of the sector. As shown in FIG. 4_a_, each parasitic element p[n] may be configured not to entirely enclose the geometric origin p0. The parasitic elements p[1] to p[4] may help to enhance performances of the antenna 100; e.g., to expand bandwidth, to improve impedance matching, to reduce undesired tilt of radiation directivity and/or to increase XPD, etc.

FIG. 4_b_ depicts arrangement of the parasitic elements p[1] to p[4] in an embodiment of the antenna 100 by a side view (with the coupling elements c[1] to c[4] and the radiators r[1] to r[4] hidden except the arm plates b[1] and b[2]) As shown in FIG. 4_b_, in an embodiment, the parasitic elements p[1] to p[4] may be positioned above the ground plane G0 by a distance (height) d2 (measured between a bottom surface of each parasitic element p[n] and the top surface of the ground plane G0). While each arm plate b[n] may be positioned above the ground plane G0 by the distance (height) d1 (also shown in FIG. 2_d_), in an embodiment, the distances d1 and d2 may be different. For example, in an embodiment as shown in FIG. 4_b_, the height d1 may be higher than the height d2, i.e., each arm plate b[n] may be higher than each parasitic element p[n]. In another embodiment (not depicted), the height d1 may be lower than the height d2, i.e., the parasitic element p[n] may be placed above the arm plate b[n]. In an embodiment, the antenna 100 may be implemented by PCB, and each parasitic element p[n] may be formed by a metal layer.

In an embodiment, such as the one shown in FIG. 4_b_, all parasitic elements p[1] to p[4] may be placed at the same height d2. On the other hand, in other embodiments, different subsets of the parasitic elements p[1] to p[4] may be arranged at different heights; some of this kind of embodiments will be described later.

FIG. 4_c_ depicts an embodiment of each parasitic element p[n] by a top view. Each parasitic element p[n] may include a plurality of serially connected sections s[n1] to s[nQ]; each section s[nq] (for q=1 to Q) may extend along a direction v[nq] by a length L[nq] (a size along the direction v[nq]) and a width w[nq] (a size perpendicular to the direction v[nq]). In an embodiment, the directions v[nq] and v[n(q+1)] of every two adjacent sections s[nq] and s[n(q+1)] (for q=1 to (Q−1)) may be different, i.e., every two adjacent sections s[nq] and s[n(q+1)] may respectively extend along two nonparallel directions v[nq] and v[n(q+1)], and an angle between the directions v[nq] and v[n(q+1)] may be less than, equal to or greater than 90 degrees. In an embodiment, the xy-plane projection of each parasitic element p[n] may be configured not to be rectangular. The count Q of the sections s[n1] to s[nQ], as well as the direction v[nq], the width w[nq] and the length L[nq] of each section s[nq] may be adjustable and configurable for flexibility, adaptability and/or performance tuning, etc. For example, in an embodiment, the width w[n1] to w[nQ] of the sections s[n1] to s[nQ] may be set substantially equal; in other embodiments, different subsets of the sections s[n1] to s[nQ] may have different widths, e.g., w[n1]=w[nQ]>w[n2]=w[n(Q−1)], etc.

FIGS. 4_d_ to 4_f_ depict different embodiments of each parasitic element p[n] by top views. As shown in FIG. 4_d_, in an embodiment, on xy-plane, the projection of each parasitic element p[n] may partially overlap the projection of the radiator r[n] (e.g., the projection of the arm plate b[n]). In other words, the projection of the parasitic element p[n] may have one or more portions, e.g., 401 and 402, inside the projection of the radiator r[n], and may also have other portion(s), e.g., 403, outside the projection of the radiator r[n]. As shown in FIG. 4_e_, in a different embodiment, the projection of the parasitic element p[n] may be completely inside the projection of the radiator r[n]. As shown in FIG. 4_f_, in another embodiment, the projection of the parasitic element p[n] may be configured not to overlap the projection of the radiator r[n]; i.e., the projection of the parasitic element p[n] may be entirely outside the projection of the radiator r[n]. In the embodiment shown in FIG. 4_f_, the height d2 of each parasitic element p[n] (FIG. 4_b_) may also be set substantially equal to the height d1 of the arm plate b[n] besides setting the heights d2>d1 or d1>d2.

In an embodiment, such as the one shown in FIG. 4_a_ or 4_e_, on xy-plane, the projections of any two parasitic elements p[n] and p[n'] (with n and n' unequal) may be configured not to overlap. On the other hand, in a different embodiment, such as the one shown in FIG. 4_g_ described below, the projection of one parasitic element p[n] may be configured to partially overlap the projection of another parasitic element p[n'] (with n and n' unequal), i.e., the projection of the parasitic element p[n] may have a portion inside the projection of another parasitic elements p[n'].

FIG. 4_g_ depicts an embodiment of the parasitic elements p[1] to p[4] by a top view of the antenna 100 (with the ground plane G0 hidden). In this embodiment, the parasitic elements p[1] and p[3] may be arranged at the height d2 (not shown) above the ground plane G0 (not shown), while the parasitic elements p[2] and p[4] may be arranged at a different height d2' (not shown) above the ground plane G0. In addition, two adjacent parasitic elements of two different heights may be configured to have partially overlapping xy-plane projections. For example, as shown in FIG. 4_g_, the parasitic elements p[1] and p[2] of two different heights may have partially overlapping xy-plane projections; because of the height difference, the parasitic elements p[1] and p[2] may remain insulated even though their xy-plane projections partially overlap. Similarly, the xy-plane projections of the parasitic elements p[2] and p[3] of different heights, p[3] and p[4] of different heights, as well as p[4] and p[1] of different heights may also partially overlap. Arranging different parasitic elements to have partially overlapping xy-plane projections may help to enhance electromagnetic mutual coupling between the parasitic elements. In this embodiment, the antenna 100 may not need to include the optional coupling elements c[1] to c[4].

Figure 5A:
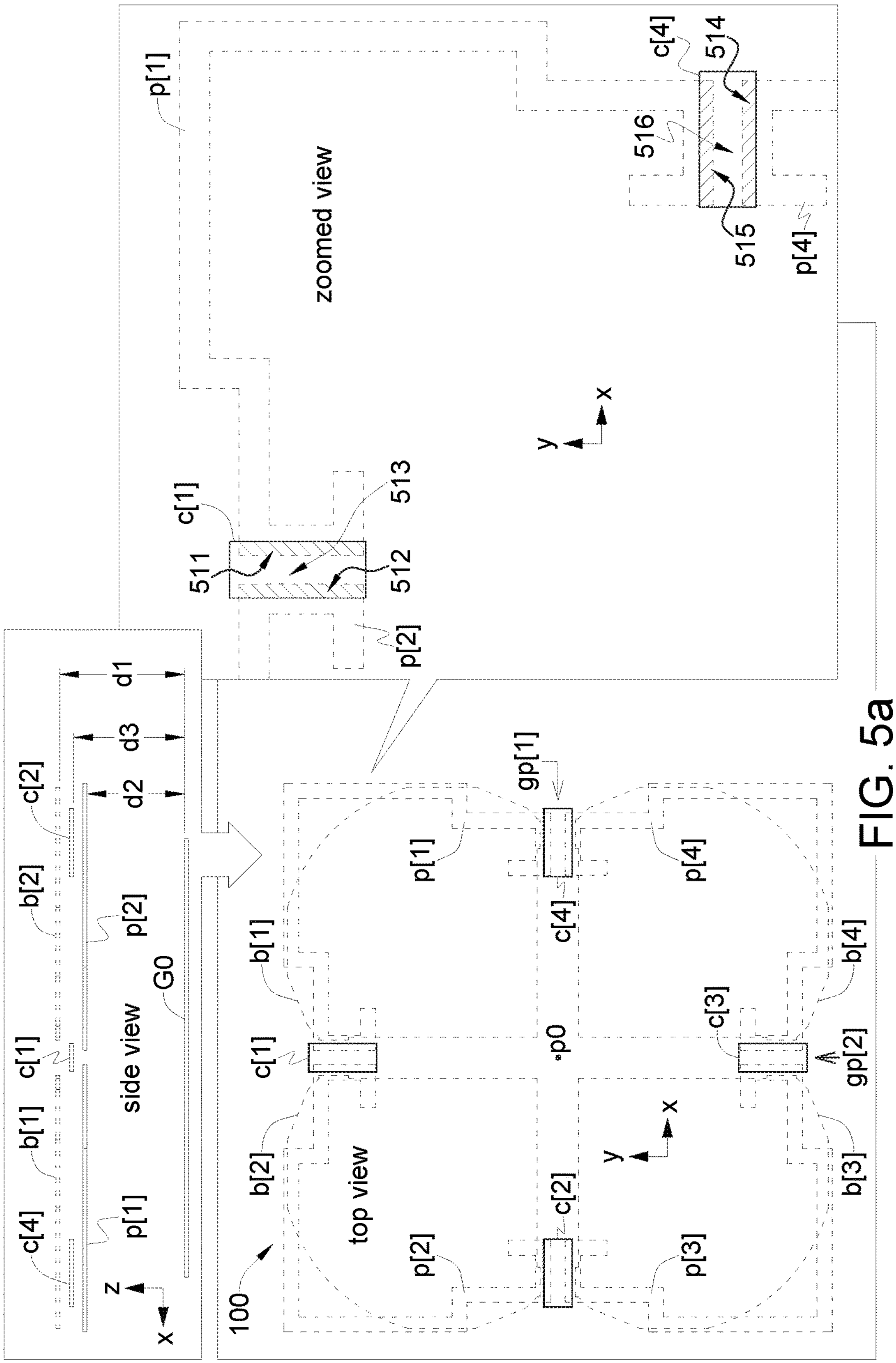
FIG. 5*a* depicts the coupling elements.

FIG. 5_a_ depicts arrangement of the parasitic elements p[1] to p[4] and the coupling elements c[1] to c[4] in an embodiment of the antenna 100 by a top view, a side view and a zoomed view detailing a portion of the top view. Each coupling element c[n] may be a planar conductor parallel to xy-plane; as shown in the side view of FIG. 5*a*, each coupling element c[n] may be positioned above the ground plane G0 by a distance (height) d3 (between a bottom surface of the coupling element c[n] and the top surface of the ground plane G0). While each arm plate b[n] and each parasitic element p[n] may respectively be at the heights d1 and d2 above the ground plane G0, in an embodiment, the height d3 may be set different from the heights d1 and d2; for example, in an embodiment (FIG. 5*a*), the height d1 may be higher than the height d3, and the height d3 may be higher than the height d2; i.e., each arm plate b[n] may be higher than each coupling element c[n], and each coupling element c[n] may be higher than each parasitic element p[n]. However, the antenna 100 may also have other embodiments (not depicted) with different d1-d2-d3 arrangements, including but not limited to: an embodiment with d1>d2>d3, an embodiment with d1=d3>d2, an embodiment with d3>d2>d1, an embodiment with d2>d3>d1, an embodiment with d2>d3=d1 and an embodiment with d2>d1>d3, etc. It is noted that the coupling elements c[1] to c[4] are optional; in some embodiments, the antenna may only need a subset (e.g., none, one, fewer than all or all) of the coupling elements c[1] to c[4]. In an embodiment, the antenna 100 may be implemented by PCB, and each coupling element c[n] may be formed by a metal layer.

In an embodiment, on xy-plane, a projection of each coupling element c[n] may have two portions respectively inside the projections of two associated parasitic elements p[n] and p[(n mod 4)+1], and one portion outside the projections of the parasitic elements p[1] to p[4]. For example, as shown in the zoomed view of FIG. 5*a*, the projection of the coupling element c[1] may have two portions 511 and 512 respectively inside the projections of the parasitic elements p[1] and p[2], as well as a portion 513 outside the projections of the parasitic elements p[1] to p[4]; similarly, the projection of the coupling element c[4] may have two portions 514 and 515 respectively inside the projections of the parasitic elements p[4] and p[1], along with a portion 516 outside the projections of the parasitic elements p[1] to p[4]. Because the projection of each coupling element c[n] may be arranged to partially overlap the projections of the two associated parasitic elements p[n] and p[(n mod 4)+1], each coupling element c[n] may provide a capacitive coupling to enhance electromagnetic coupling between said two associated parasitic elements.

Figure 5B:
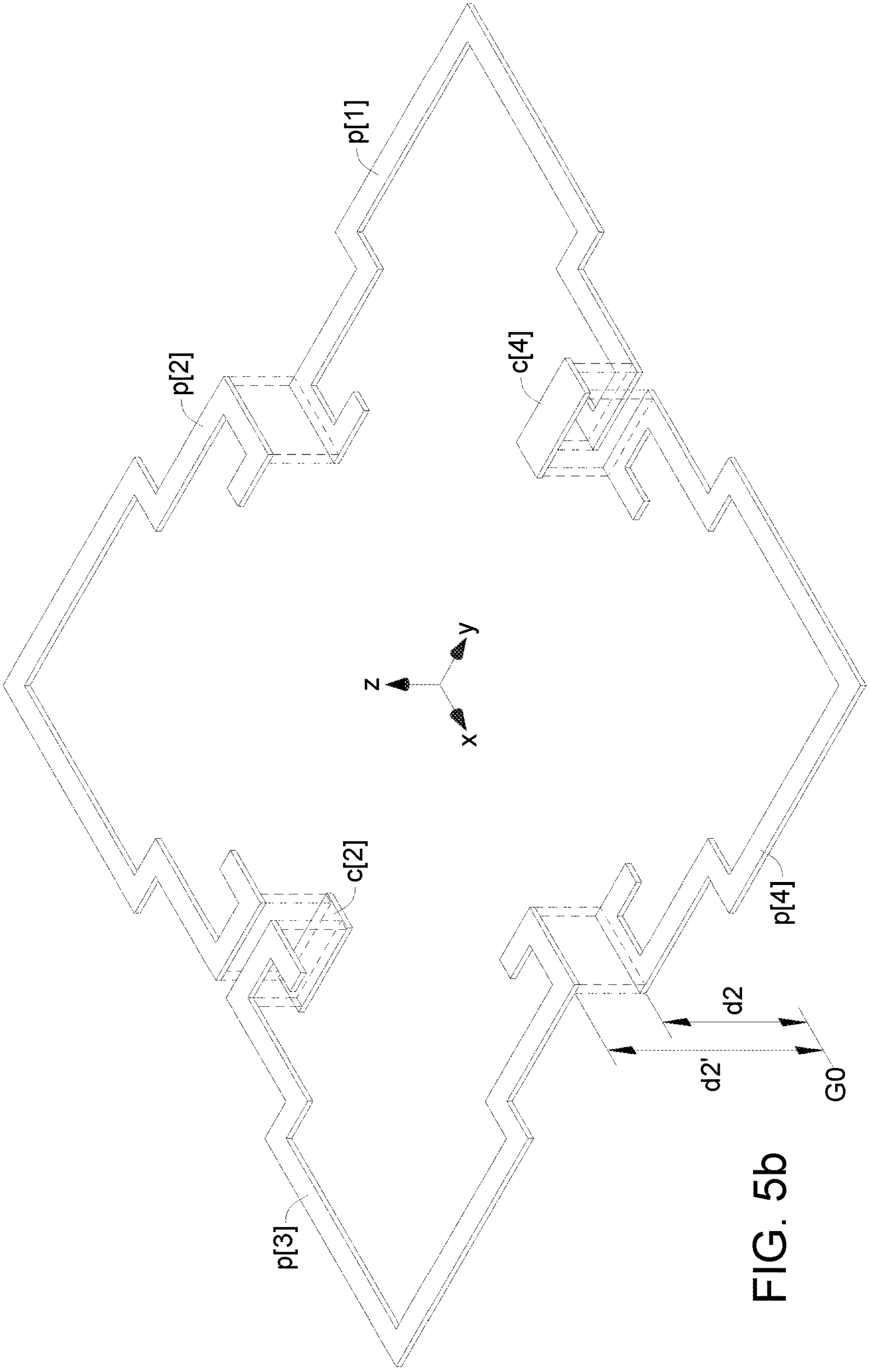
FIG. 5*b* depicts an arrangement of the coupling elements and the parasitic elements according to an embodiment of the invention.

By a 3D view, FIG. 5*b* depicts another embodiment of arranging the parasitic elements and the coupling elements. In this embodiment, the parasitic elements p[1] and p[4], along with the coupling element c[2], may be placed at a height d2, while the parasitic elements p[2] and p[3], along with the coupling element c[4], may be placed at another height d2' different from the height d2. The coupling elements c[1] and c[3] may not be included in this embodiment. The parasitic elements p[1] and p[2] of different heights may have partially overlapping xy-plane projections; the parasitic elements p[3] and p[4] may also have partially overlapping xy-plane projections. On the other hand, the parasitic elements p[2] and p[3] of the same height may not have partially overlapping xy-plane projections, and the parasitic elements p[1] and p[4] of the same height may not have partially overlapping xy-plane projections. Furthermore, the coupling element c[2] of the height d2 and each of the parasitic elements p[2] and p[3] of the height d2' may have partially overlapping xy-plane projections, and the coupling element c[4] of the height d2' and each of the parasitic elements p[1] and p[4] of the height d2 may have partially overlapping xy-plane projections.

Figure 6A:
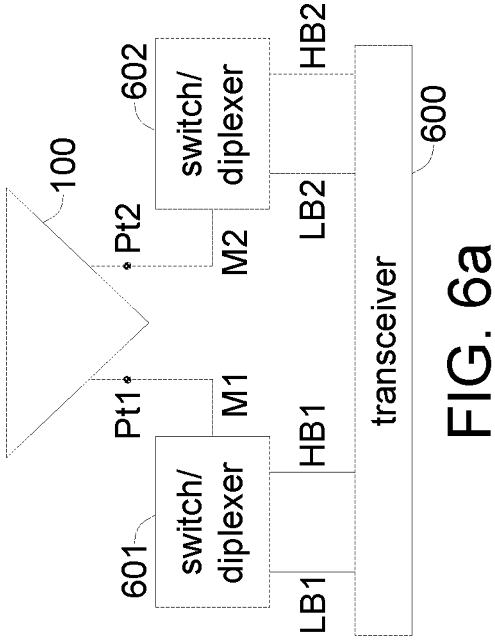
FIGS. 6*a*, 6*b* and 6*c* depict feeding configurations according to different embodiments of the invention.
Figure 6B:
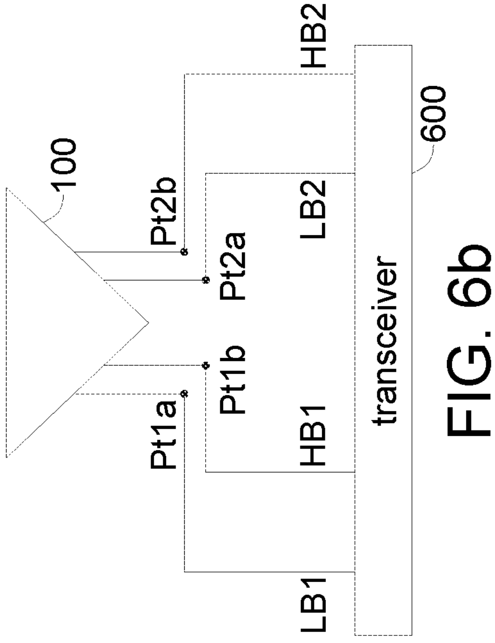
Figure 6C:
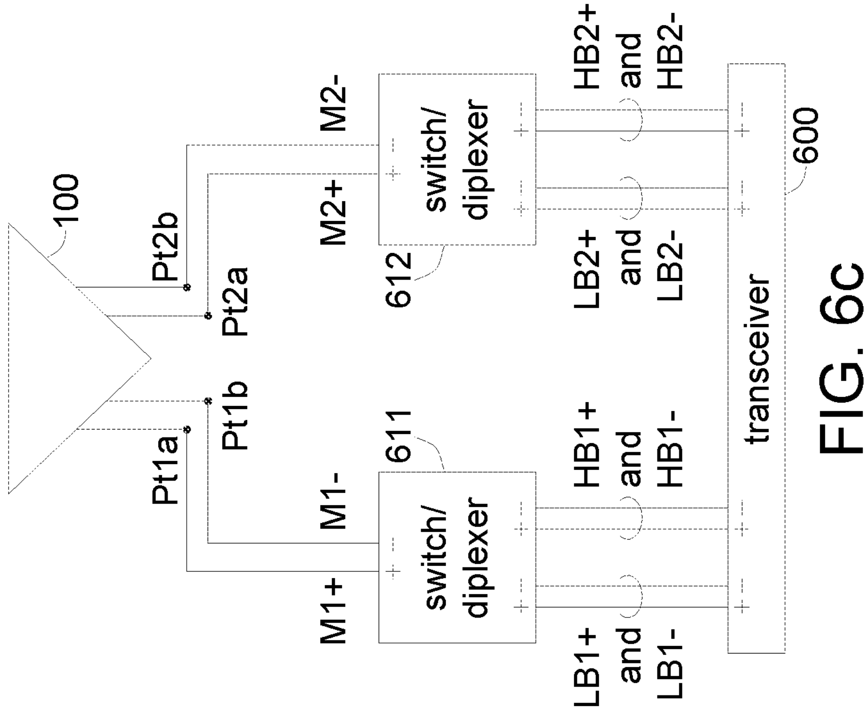

FIGS. 6*a*, 6*b* and 6*c* depict feeding configurations of the antenna 100 according to different embodiments of the invention. As shown in FIG. 6*a*, the antenna 100 may be configured to have two feed terminals Pt1 and Pt2 respectively for two multi-band (e.g., dual-band) signals M1 and M2 of a first and a second polarizations, such as a horizontal and a vertical polarizations. The terminals Pt1 and Pt2 may be respectively connected to two signal circuits 601 and 602, each of the signal circuits 601 and 602 may be a switch or a diplexer. When transmitting, a transceiver 600 may provide multiple single-band signals, such as two low-band signals LB1, LB2 and two high-band signals HB1 and HB2; the signal circuit 601 may form the multi-band signal M1 at the terminal Pt1 according to the signals LB1 and HB1, the signal circuit 602 may form the multi-band signal M2 at the terminal Pt2 according to the signals LB2 and HB2, and the antenna 100 may therefore transmit the signals M1 and M2 respectively by electromagnetic waves of the first polarization and the second polarization. When the antenna 100 receives electromagnetic waves of the first polarization and/or the second polarization, the antenna 100 may provide the signals M1 and/or M2 at the terminals Pt1 and/or Pt2; the signal circuit 601 may form the signals LB1 and HB1 from the signal M1, and/or the signal circuit 602 may form the signals LB2 and HB2 from the signal M2, so the transceiver 600 may receive the signals LB1, HB1 and/or LB2, HB2.

As shown in FIG. 6*b*, the antenna 100 may also be configured to have four feed terminals Pt1*a*, Pt2*a*, Pt1*b* and Pt2*b* connected to the transceiver 600, for the two low-band signals LB1, LB2 and the two high-band signals HB1, HB2. When transmitting, the transceiver 600 may provide the low-band signals LB1, LB2 and the high-band signals HB1, HB2 respectively at the terminals Pt1*a*, Pt2*a*, Pt1*b* and Pt2*b*, so the antenna 100 may transmit the signals LB1 and HB1 by electromagnetic waves of the first polarization, and may transmit the signals LB2 and HB2 by electromagnetic waves of the second polarization. When the antenna 100 receives electromagnetic waves of the first polarization and/or the second polarization, the antenna 100 may form the signals LB1, HB1 and/or LB2 and HB2 respectively at the terminals Pt1*a*, Pt1*b* and/or Pt2*a*, Pt2*b* to be received by the transceiver 600.

As shown in FIG. 6*c*, the antenna 100 may also be configured to have four feed terminals Pt1*a*, Pt1*b*, Pt2*a* and Pt2*b* respectively for a first pair of differential signals M1+ and M1− and a second pair of differential signals M2+ and M2−. For example, the differential signals M1+ and M1− may be a pair of multi-band (dual-band) differential signals; similarly, the differential signals M2+ and M2− may be another pair of multi-band (dual-band) differential signals. In an embodiment, the terminals Pt1*a* and Pt1*b* may be connected to a signal circuit 611, and the terminals Pt2*a* and Pt2*b* may be connected to a signal circuit 612; each of the signal circuits 611 and 612 may be a differential switch or a differential diplexer. When transmitting, a transceiver 600 may provide multiple pairs of single-band differential signals, such as two pairs of low-band differential signals LB1+ and LB1−, LB2+ and LB2−, as well as two pairs of high-band differential signals HB1+ and HB1−, HB2+ and HB2−. The signal circuit 611 may form the multi-band differential signals M1+ and M1− at the terminal Pt1*a* and Pt1*b* according to the signals LB1+, LB1−, HB1+ and HB1−, and the signal circuit 612 may form the multi-band differential signal M2+ and M2− at the terminal Pt2*a* and Pt2*b* according to the signals LB2+, LB2−, HB2+ and HB2−, and the antenna 100 may therefore transmit the signals M1+ and M1− by electromagnetic waves of the first polarization, and transmit the signals M2+ and M2− by electromagnetic waves of the second polarization. When the antenna 100 receives electromagnetic waves of the first polarization and/or the second polarization, the antenna 100 may provide the signals M1+ and M1− and/or M2+ and M2− at the terminals Pt1*a*, Pt1*b* and/or Pt2*a* and Pt2*b*, the signal circuit 611 may form the signals LB1+, LB1−, HB1+ and HB1− from the signals M1+ and M1−, and/or the signal circuit 612 may form the signals LB2+, LB2−, HB2+ and HB2− from the signals M2+ and M2−, so the transceiver 600 may receive the signals LB1+, LB1−, HB1+ and HB1− and/or LB2+, LB2−, HB2+ and HB2−.

Figure 7B:
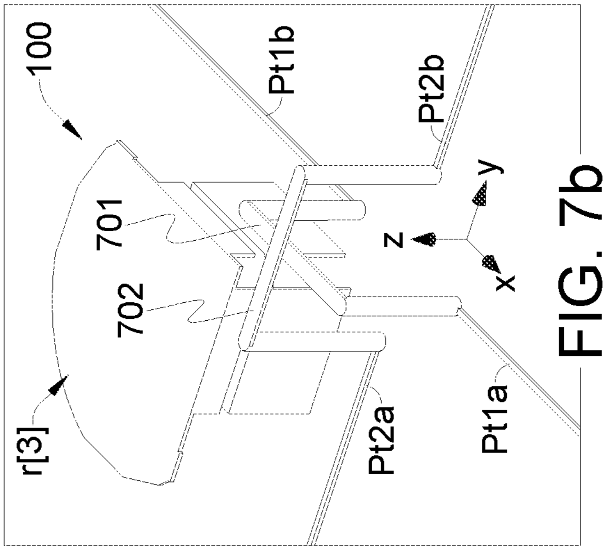
FIGS. 7*a* to 7*d* depict feeding elements of the antenna according to different embodiments of the invention.
Figure 7A:
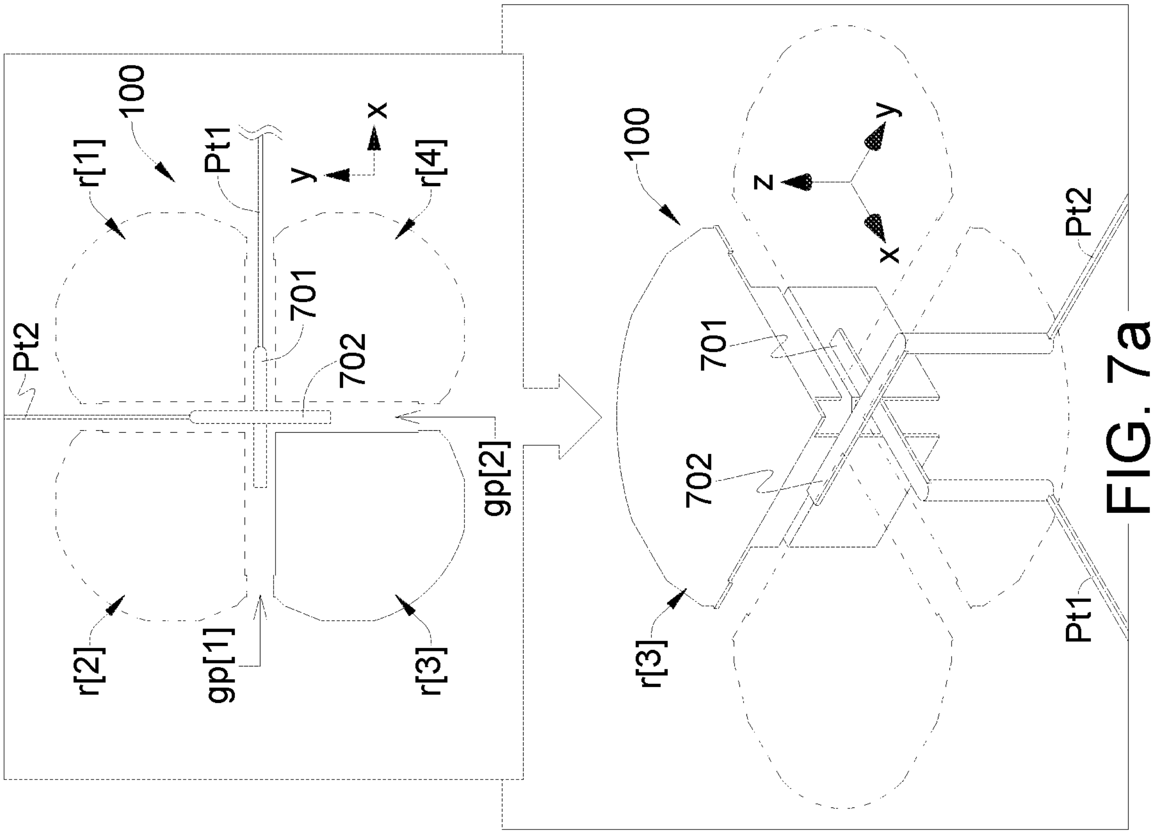

FIG. 7*a* depicts an embodiment of a feeding arrangement of the antenna 100 by a high angle 3D view and a top view of the antenna 100 (with the ground plane G0, the parasitic elements p[1] to p[4], the optional coupling elements c[1] to c[4] and the radiators r[1] to r[4] hidden except r[3]). As shown in FIG. 7*a*, the antenna 100 may further include multiple conductive feeding elements, such as two feeding elements 701 and 702. Each of the feeding elements 701 and 702 may be separated and insulated from the ground plane G0, the optional coupling elements c[1] to c[4], the parasitic elements p[1] to p[4] and the radiators r[1] to r[4]. The feeding elements 701 and 702 may also be separated and insulated from each other. As shown in FIG. 7*a*, in an embodiment, the feeding element 701 may extend across the gap gp[2] along the gap gp[1], and one end of the feeding element 701 may connect a conducive via and a conductive outbound trace to function as the terminal Pt1 for the feeding configuration in FIG. 6*a*; on the other hand, the feeding element 702 may extend across the gap gp[1] along the gap gp[2], and one end of the feeding element 702 may connect a via and an outbound trace to function as the terminal Pt2 for the feeding configuration in FIG. 6*a*. By the feeding element 701 shown in FIG. 7*a*, the radiators r[1] and r[4] may jointly function as one pole of a first dipole for a polarization along x-direction, while the radiators r[2] and r[3] may jointly function as an opposite pole of the first dipole. By the feeding element 702 shown in FIG. 7*a*, the radiators r[1] and r[2] may jointly function as one pole of a second dipole for a polarization along y-direction, while the radiators r[3] and r[4] may jointly function as an opposite pole of the second dipole.

Based on the embodiment shown in FIG. 7*a* which may implement the feeding configuration in FIG. 6*a*, FIG. 7*b* depicts another embodiment of the feeding arrangement which may implement the feeding configuration in FIG. 6*b* or 6*c*. As shown in FIG. 7*b*, two opposite ends of the feeding element 701 may respectively connect two vias and two outbound traces to function as the terminals Pt1*a* and Pt1*b* for the feeding configuration in FIG. 6*b* or 6*c*, while two opposite ends of the feeding element 702 may respectively connect two vias and two outbound traces to function as the terminals Pt2*a* and Pt2*b* for the feeding configuration in FIG. 6*b* or 6*c*.

Figure 7C:
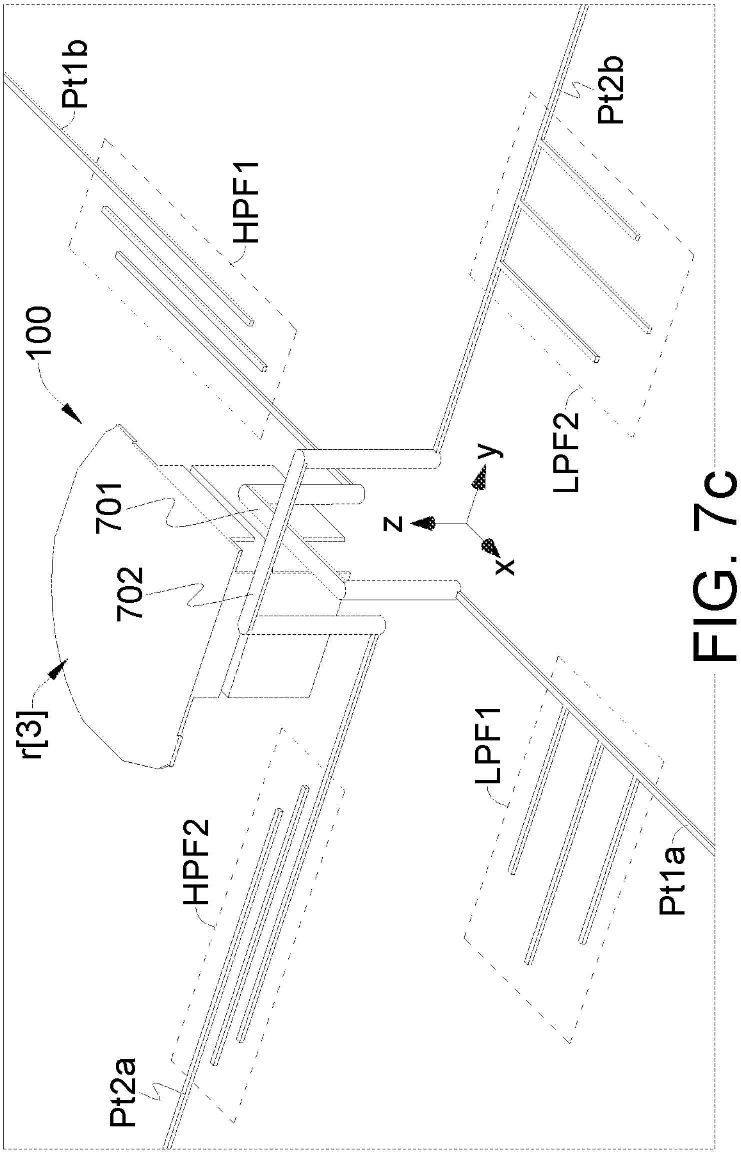

Based on the embodiment shown in FIG. 7*b*, FIG. 7*c* depicts one more embodiment of the feeding arrangement. In FIG. 7*c*, two opposite ends of the feeding element 701 may respectively connect two vias, a low-pass filter LPF1 and a high-pass filter HPF1, as well as two outbound traces to function as the terminals Pt1*a* and Pt1*b* for the feeding configuration in FIG. 6*b*; similarly, two opposite ends of the feeding element 702 may respectively connect two vias, a low-pass filter LPF2 and a high-pass filter HPF2, as well as two outbound traces to function as the terminals Pt2*a* and Pt2*b* for the feeding configuration in FIG. 6*b*. The filters LPF1 and HPF1 of the feeding elements 701 may suppress mutual interference between the low-band signal LB1 and the high-band signal HB1 (FIG. 6*b*) to enhance signal isolation between the signals LB1 and HB1; similarly, the filters LPF2 and HPF2 of the feeding elements 702 may suppress interference between the low-band signal LB2 and the high-band signal HB2 (FIG. 6*b*) to enhance signal isolation between the signals LB2 and HB2. It is noted that the filter(s) LPF1, LPF2, HPF1 and/or HPF2 may be optional; whether to include said filter(s) in the antenna 100 may depend on consideration(s) such as isolation requirements. In other embodiment(s) (not depicted), the filter(s) LPF1, LPF2, HPF1 and/or HPF2 may be replaced by SPST (single pole single throw) switch(es) and/or impedance tuner(s). Again, it is emphasized that said filter(s), switch(es) and/or impedance tuner(s) may be optional, and whether to include said filter(s), switch(es) and/or impedance tuner(s) in the antenna 100 may depend on factor(s) such as isolation requirements.

Figure 7D:
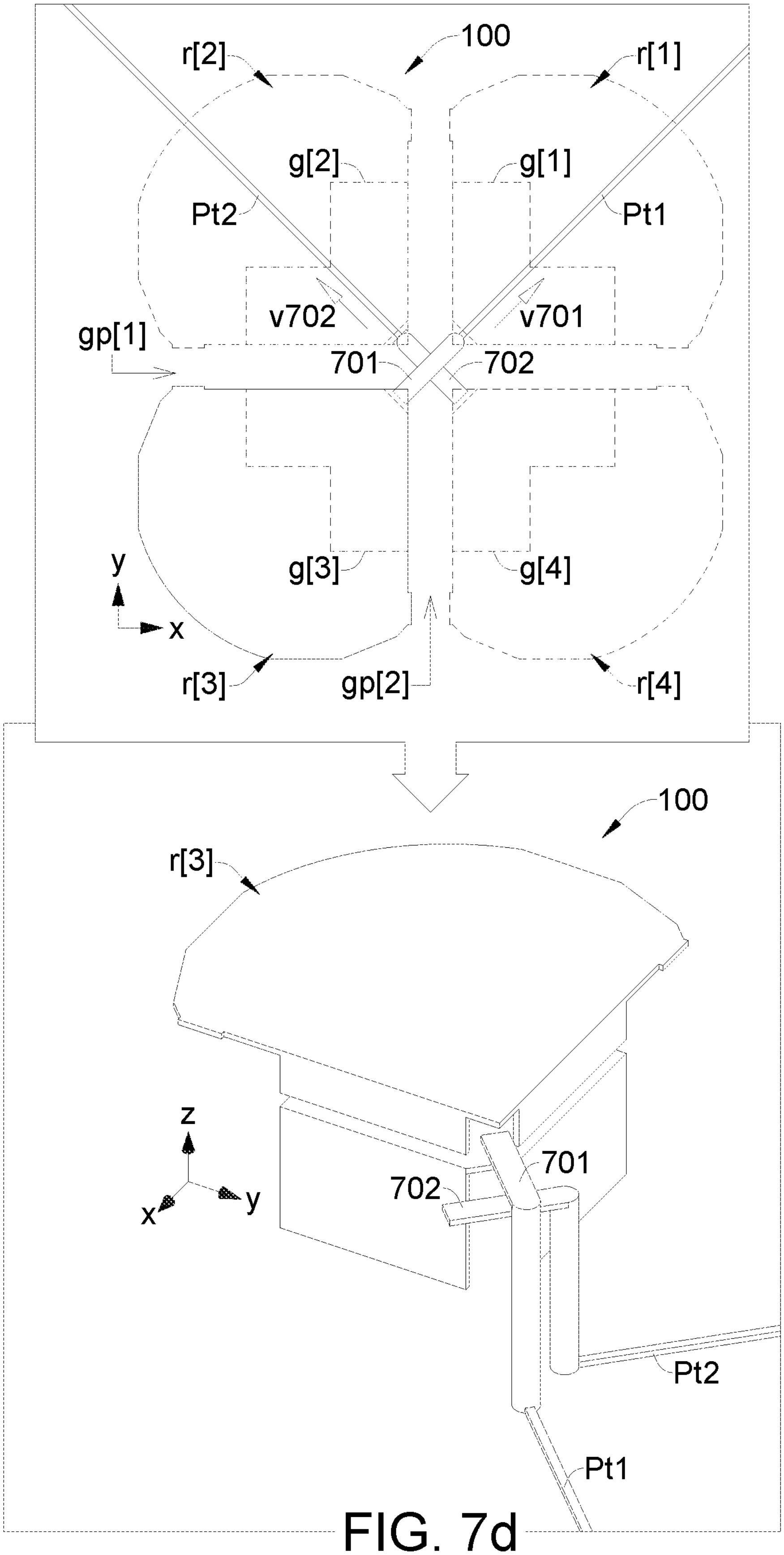

FIG. 7*d* depicts another embodiment of the feeding arrangement of the antenna 100 by a high angle 3D view and a top view of the antenna 100 (with the ground plane G0, the parasitic elements p[1] to p[4], the optional coupling elements c[1] to c[4] and the radiators r[1] to r[4] hidden except r[3]). As shown in FIG. 7*d*, in an embodiment, the feeding elements 701 and 702 may be fitted in an intersection of the gaps gp[1] and gp[2]. The feeding element 701 may extend parallel to a direction v701, and one end of the feeding element 701 may connect a conducive via and a conductive outbound trace to function as the terminal Pt1 for the feeding configuration in FIG. 6*a*. The feeding element 702 may extend parallel to a direction v702, and one end of the feeding element 702 may connect a via and an outbound trace to function as the terminal Pt2 for the feeding configuration in FIG. 6*a*. For example, in an embodiment, the direction v701 may substantially be 45 degrees rotated from x-direction, and the direction v702 may substantially be 45 degrees rotated from y-direction. By the feeding element 701 shown in FIG. 7*d*, the radiators r[1] and r[3] may respectively function as two opposite poles of a first dipole for a polarization along the direction v701, and the radiators r[2] and r[4] may respectively function as two opposite poles of a second dipole for the polarization along the direction v701. By the feeding element 702 shown in FIG. 7*d*, the radiators r[2] and r[4] may respectively function as two opposite poles of a third dipole for a polarization along the direction v702, and the radiators r[1] and r[3] may respectively function as two opposite poles of a fourth dipole for the polarization along the direction v702. Similar to FIGS. 7*b* and 7*c*, by utilizing both ends of each of the feeding elements 701 and 702, the embodiment having two feed terminals Pt1 and Pt2 in FIG. 7*d* may be modified to other embodiments (not depicted) having four feed terminals Pt1*a*, Pt1*b*, Pt2*a* and Pt2*b* for the feeding configuration in FIG. 6*b* or 6*c*. Besides the embodiments shown in FIGS. 7*a* to 7*d*, the antenna 100 may also adopt other feeding arrangements, such as direct feeding or slot feeding, etc.

Figure 8:
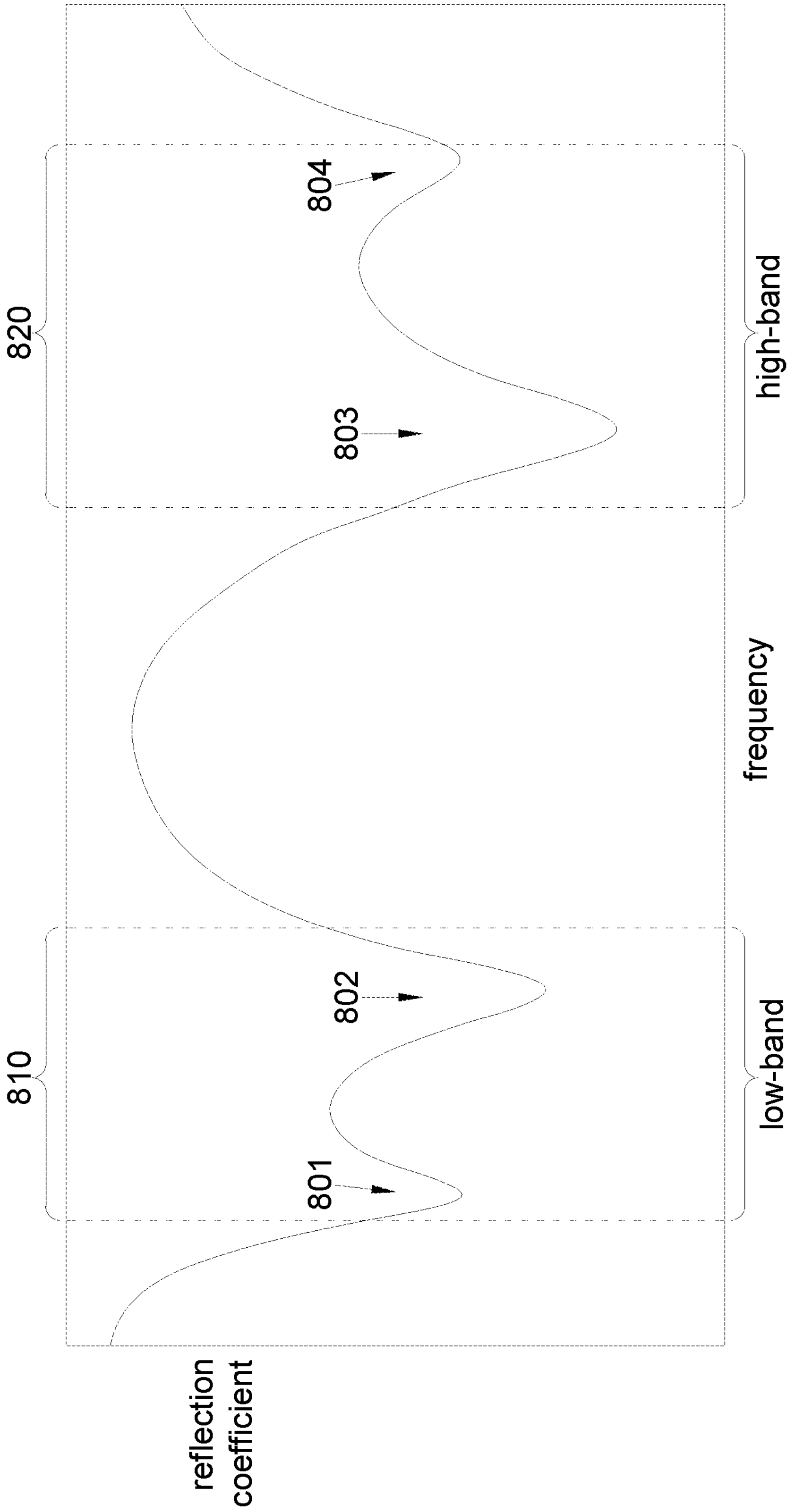
FIG. 8 depicts reflection coefficient according to an embodiment of the invention.

FIG. 8 depicts reflection coefficient of the antenna 100 according to an embodiment of the invention. By the radiators r[1] to r[4] and the parasitic elements p[1] to p[4] (as well as the optional coupling elements c[1] to c[4]) of the invention, in an embodiment, the antenna 100 may form four notches 801, 802, 803 and 804 to cover a low-band 810 and a high-band 820, and may therefore satisfy challenging demands of dual-broadband communication. For example, in an embodiment, the radiators r[1] to r[4] may provide two resonance modes respectively at the low-band 810 and the high-band 820, and the parasitic elements p[1] to p[4] may provide another two resonance modes respectively at the low-band 810 and the high-band 820. In other words, each radiator r[n] may contribute to resonances at the two bands 810 and 820. Different from the antenna 100 of the invention, conventional dipole antenna can only support a single band.

To sum up, by folded arms (e.g., h[11] to h[41] and h[12] to h[42]), meandering grounding (e.g., gb[1] to gb[4]) and partially surrounding parasitic elements (e.g., p[1] to p[4]), the antenna 100 according to the invention may achieve multi-broadband and multi-polarization. Comparing to conventional antenna such as stacked patch antenna, the antenna 100 according to the invention may provide much broader bandwidths at multiple bands, higher bandwidth-to-volume ratio, less undesired tilt in radiation directivity, better XPD and superior signal isolation between different polarizations for MIMO. The antenna 100 according to the invention may therefore satisfy demanding needs of modern communication, such as 5G mobile telecommunication with MIMO.

While the invention has been described in terms of what is presently, considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An antenna for multi-broadband and multi-polarization communication, comprising:

a plurality of radiators, being mutually separated, being connected to a ground plane, and being configured to jointly function as one or more dipoles;

a first feed terminal for a first signal of a first polarization;

a second feed terminal for a second signal of a second polarization;

a first feeding element, being conductive; and a second feeding element, being conductive, and being separated and insulated from the first feeding element; wherein:

each of the plurality of radiators is configured to contribute to resonances at two or more nonoverlapping bands;

the first polarization and the second polarization are different;

each of the first feeding element and the second feeding element is separated and insulated from the ground plane and the plurality of radiators;

the first feed terminal is coupled to the first feeding element;

the second feed terminal is coupled to the second feeding element;

on a geometric reference surface, projections of the plurality of radiators are separated by a first gap and a second gap;

a projection of the first feeding element extends across the second gap along the first gap; and a projection of the second feeding element extends across the first gap along the second gap.

2. The antenna of claim 1, wherein each of the first signal and the second signal is a multi-band signal.

3. The antenna of claim 1, wherein each of plurality of radiators comprises:

a conductive arm which comprises a conductive arm plate and a conductive folded arm; and a conductive ground wall; wherein:

the conductive ground wall extends outward from a bottom surface of the conductive arm plate to the ground plane;

the conductive folded arm extends outward from the bottom surface of the conductive arm plate or from a top surface of the conductive arm plate opposite to the bottom surface of the conductive arm plate; and the conductive folded arm is separated from the conductive ground wall and the ground plane.

4. The antenna of claim 3, wherein:

the conductive ground wall extends outward from a first site of the bottom surface of the conductive arm plate;

the conductive folded arm extends outward from a second site of the top or bottom surface of the conductive arm plate;

on a second geometric reference surface parallel to the bottom surface of the conductive arm plate, a projection of the first site is in an inner geometric region inside a projection of the conductive arm plate; and on the second geometric reference surface, a projection of the second site is in a peripheral geometric region between a boundary of the inner geometric region and a boundary of the projection of the conductive arm plate.

5. The antenna of claim 1, wherein:

on the geometric reference surface, the projections of two of the plurality of radiators are substantially the same, and face toward two nonparallel directions.

6. The antenna of claim 1, further comprising:

a plurality of conductive parasitic elements, being mutually insulated, and each of the plurality of conductive parasitic elements being insulated from the plurality of radiators and the ground plane; wherein:

on the geometric reference surface, a projection of each of the plurality of conductive parasitic elements extends between the first gap and the second gap, and does not enclose a geometric origin which is a geometric center of the projections of the plurality of radiators.

7. The antenna of claim 6, further comprising one or more conductive coupling elements; wherein:

each of the one or more conductive coupling elements is insulated from the plurality of radiators, the plurality of conductive parasitic elements and the ground plane; and on the geometric reference surface, a projection of each of the one or more conductive coupling elements has two portions respectively inside the projections of two of the plurality of conductive parasitic elements.

8. The antenna of claim 6, wherein:

on the geometric reference surface, the projections of any two of the plurality of conductive parasitic elements do not overlap.

9. The antenna of claim 6, wherein:

on the geometric reference surface, the projections of two of the plurality of conductive parasitic elements partially overlap.

10. The antenna of claim 6, wherein:

each of the plurality of conductive parasitic elements comprises at least two serially connected sections, and every two adjacent ones of the at least two sections extend along two nonparallel directions.

11. The antenna of claim 1, wherein each of the plurality of radiator comprises:

a conductive arm; and a conductive ground wall connecting the conductive arm and the ground plane;

wherein the conductive ground wall comprises:

a meandering portion causing a distance between the conductive arm and the ground plane to be shorter than a length of a current conduction path along the conductive ground wall between the conductive arm and the ground plane;

a first support wall connecting the conductive arm and the meandering portion; and a second support wall connecting the meandering portion and the ground plane.

12. The antenna of claim 11, wherein the meandering portion comprises:

a first step plate connected to the first support wall;

a second step plate connected to the second support wall; and a connection wall connecting the first step plate and the second step plate; wherein:

on a second geometric reference surface parallel to the ground plane, a projection of the connection wall does not overlap projections of the first support wall and the second support wall.

13. The antenna of claim 12, wherein:

on the second geometric reference surface, the projections of the first support wall and the second support wall do not overlap.

14. An antenna for multi-broadband and multi-polarization communication, comprising:

a plurality of radiators, being mutually separated, being connected to a ground plane, and being configured to jointly function as one or more dipoles;

a first feed terminal for a first signal of a first polarization;

a second feed terminal for a second signal of a second polarization;

a first feeding element, being conductive; and a second feeding element, being conductive, and being separated and insulated from the first feeding element wherein:

each of the plurality of radiators is configured to contribute to resonances at two or more nonoverlapping bands;

the first polarization and the second polarization are different;

each of the first feeding element and the second feeding element is separated and insulated from the ground plane and the plurality of radiators;

the first feed terminal is coupled to the first feeding element;

the second feed terminal is coupled to the second feeding element;

on a geometric reference surface, projections of the plurality of radiators are separated by a first gap and a second gap;

a projection of the first feeding element extends parallel to a first direction;

a projection of the second feeding element extends parallel to a second direction;

the first direction is not parallel to the first gap and the second gap; and the second direction is not parallel to the first gap, the second gap and the first direction.

15. An antenna for multi-broadband and multi-polarization communication, comprising:

a plurality of radiators, being mutually separated, being connected to a ground plane, and being configured to jointly function as one or more dipoles;

a first feed terminal for a first signal of a first polarization;

a second feed terminal for a second signal of a second polarization;

a third feed terminal for a third signal of the first polarization; and a fourth feed terminal for a fourth signal of the second polarization; wherein:

each of the plurality of radiators is configured to contribute to resonances at two or more nonoverlapping bands; and the first polarization and the second polarization are different and wherein:

the first to fourth signals are a low-band signal of the first polarization, a low-band signal of the second polarization, a high-band signal of the first polarization, a high-band signal of the second polarization, respectively; or the first to fourth signals are a first one of a pair of multi-band differential signals of the first polarization, a first one of a pair of multi-band differential signals of the second polarization, a second one of the pair of multi-band differential signals of the first polarization, and a second one of the pair of multi-band differential signals of the second polarization, respectively.

16. The antenna of claim 15, further comprising:

a first feeding element, being conductive; and a second feeding element, being conductive, and being separated and insulated from the first feeding element; wherein:

each of the first feeding element and the second feeding element is separated and insulated from the ground plane and the plurality of radiators;

the first feed terminal and the third feed terminal are coupled to two opposite ends of the first feeding element, respectively; and the second feed terminal and the fourth feed terminal are coupled to two opposite ends of the second feeding element, respectively.

* * * * *